US012354790B2

(12) United States Patent
Sumi

(10) Patent No.: US 12,354,790 B2
(45) Date of Patent: Jul. 8, 2025

(54) WINDING MACHINE AND METHOD OF MANUFACTURING COIL

(71) Applicant: Nidec Corporation, Kyoto (JP)

(72) Inventor: Shigeharu Sumi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 461 days.

(21) Appl. No.: 17/908,598

(22) PCT Filed: Oct. 16, 2020

(86) PCT No.: PCT/JP2020/039027
§ 371 (c)(1),
(2) Date: Sep. 1, 2022

(87) PCT Pub. No.: WO2021/199469
PCT Pub. Date: Oct. 7, 2021

(65) Prior Publication Data
US 2023/0154676 A1    May 18, 2023

(30) Foreign Application Priority Data
Mar. 31, 2020   (JP) ................................ 2020-062127

(51) Int. Cl.
*H01F 41/088*      (2016.01)
*H01F 41/061*      (2016.01)
(Continued)

(52) U.S. Cl.
CPC ......... *H01F 41/088* (2016.01); *H01F 41/061* (2016.01); *H01F 41/063* (2016.01);
(Continued)

(58) Field of Classification Search
CPC ...... H01F 41/06; H01F 41/061; H01F 41/063; H01F 41/071; H01F 41/0711;
(Continued)

(56) References Cited

U.S. PATENT DOCUMENTS 3,141,806 A * 7/1964 Reinman ................. B29C 70/00
242/444
3,927,456 A * 12/1975 Dammar ................. H02K 15/09
29/598

(Continued)

FOREIGN PATENT DOCUMENTS

CN      101110335 A  *  1/2008  ........... H01F 41/088
EP      2034592 A2   *  3/2009  ............ H02K 15/09
(Continued)

*Primary Examiner* — Sang K Kim
*Assistant Examiner* — Raveen J Dias
(74) *Attorney, Agent, or Firm* — Keating & Bennett, LLP

(57)   ABSTRACT

A winding machine includes a winding core around which a winding is wound, a first winding jig and a second winding jig positioned with the winding core interposed therebetween in an axial direction of a central axis of the winding core, and a first gripper and a second gripper that are located on an outer side of the winding core in a radial direction around the central axis. An outer edge portion of the first winding jig in the radial direction and an outer edge portion of the second winding jig in the radial direction are located on an outer side, in the radial direction, from the winding core. Each of the first gripper and the second gripper includes a pair of rollers to interpose and grip the winding. At least one of the first gripper or the second gripper is rotatable about the central axis.

12 Claims, 18 Drawing Sheets

(51) Int. Cl.
*H01F 41/063* (2016.01)
*H01F 41/071* (2016.01)
*H01F 41/073* (2016.01)
*H01F 41/09* (2016.01)
*H01F 41/092* (2016.01)
*H01F 41/094* (2016.01)
*H02K 15/043* (2025.01)

(52) U.S. Cl.
CPC ......... *H01F 41/071* (2016.01); *H01F 41/073* (2016.01); *H01F 41/09* (2016.01); *H01F 41/092* (2016.01); *H01F 41/094* (2016.01); *H02K 15/043* (2025.01)

(58) Field of Classification Search
CPC .... H01F 41/073; H01F 41/074; H01F 41/082; H01F 41/088; H01F 41/09; H01F 41/092; H01F 41/094; H01F 41/098; H01F 41/064; H01F 41/066; H01F 41/068; H01F 2041/0711; H02K 15/04; H02K 15/043; H02K 15/0435; H02K 15/0442; H02K 15/045; H02K 15/10; H02K 15/105; H02K 1/14; H02K 1/148; H02K 1/16; H02K 3/18; B65H 57/006; B65H 57/14; B65H 57/28; B65H 54/103; B65H 54/14; B65H 54/28; B65H 54/30; B65H 54/42; B65H 54/44; B65H 54/52; B65H 54/543; B65H 54/553
See application file for complete search history.

(56) References Cited

U.S. PATENT DOCUMENTS

| | | | | |
|---|---|---|---|---|
| 4,340,186 A * | 7/1982 | Shimada | ............... | B65H 54/10 140/92.1 |
| 4,616,788 A * | 10/1986 | Finegold | ............... | H02K 15/09 29/598 |
| 4,870,742 A * | 10/1989 | Roloff | ............... | H01F 41/098 29/605 |
| 5,144,735 A * | 9/1992 | Stark | ............... | H01F 41/0253 29/598 |
| 6,315,270 B1 * | 11/2001 | Fallon | ............... | B65H 57/14 254/134.3 PA |
| 9,914,161 B2 * | 3/2018 | Muto | ............... | B21C 47/146 |
| 11,901,777 B2 * | 2/2024 | Yamagishi | ............... | H01F 41/064 |
| 2003/0150951 A1 * | 8/2003 | Ponzio | ............... | H01F 41/088 242/433.3 |
| 2005/0206264 A1 * | 9/2005 | Yamamoto | ............... | H02K 13/04 310/195 |
| 2015/0115092 A1 * | 4/2015 | Saito | ............... | H01R 43/033 242/439.1 |
| 2015/0183614 A1 * | 7/2015 | Muto | ............... | H01F 41/088 242/530 |
| 2015/0273553 A1 * | 10/2015 | Muto | ............... | B21C 47/146 29/605 |
| 2016/0065007 A1 * | 3/2016 | Sumi | ............... | H02K 1/08 310/216.057 |
| 2016/0351329 A1 * | 12/2016 | Kanno | ............... | H01F 41/07 |
| 2017/0330672 A1 * | 11/2017 | Uchida | ............... | H01F 27/255 |
| 2019/0103782 A1 * | 4/2019 | Imaizumi | ............... | H02K 3/522 |
| 2020/0139423 A1 * | 5/2020 | Sumi | ............... | H02K 3/18 |
| 2020/0144900 A1 * | 5/2020 | Sumi | ............... | H02K 1/146 |
| 2020/0177056 A1 * | 6/2020 | Nakamura | ............... | H02K 5/203 |
| 2020/0227199 A1 * | 7/2020 | Ochiai | ............... | H01F 41/06 |
| 2021/0099040 A1 * | 4/2021 | Shiraishi | ............... | H02K 3/522 |
| 2021/0376670 A1 * | 12/2021 | Sumi | ............... | H02K 1/148 |
| 2022/0190695 A1 * | 6/2022 | Yamagishi | ............... | B65H 54/2869 |
| 2023/0045439 A1 * | 2/2023 | Sumi | ............... | H02K 15/04 |
| 2024/0321515 A1 * | 9/2024 | Huang | ............... | H01F 41/061 |

FOREIGN PATENT DOCUMENTS

| | | | | | |
|---|---|---|---|---|---|
| EP | 3624315 A1 | * | 3/2020 | ............ | H01F 41/088 |
| JP | 2002369465 A | * | 12/2002 | ............ | H02K 15/09 |
| JP | 2012-139098 A | | 7/2012 | | |
| KR | 100639706 B1 | * | 10/2006 | ............ | H01F 41/06 |
| WO | WO-2010109930 A1 | * | 9/2010 | ............ | H01F 41/06 |
| WO | WO-2011074629 A1 | * | 6/2011 | ............ | H01F 41/074 |
| WO | WO-2020017308 A1 | * | 1/2020 | ............ | H01F 41/064 |

* cited by examiner

WINDING MACHINE AND METHOD OF MANUFACTURING COIL

CROSS REFERENCE TO RELATED APPLICATION

This is a U.S. national stage of application No. PCT/JP2020/039027, filed on Oct. 16, 2020, and with priority under 35 U.S.C. § 119 (a) and 35 U.S.C. § 365 (b) being claimed from Japanese Application No. 2020-062127, filed on Mar. 31, 2020, the entire contents of which are hereby incorporated herein by reference.

1. FIELD OF THE INVENTION

The present application relates to a winding machine and a method of manufacturing a coil.

2. BACKGROUND

For example, there is known a method of manufacturing a coil in which a winding is pressed and wound by moving a wire rod guide holding portion in accordance with a timing at which the winding is wound.

In the above-described method of manufacturing the coil, it is necessary to move the wire rod guide holding portion in accordance with the timing at which the winding is wound, and thus the structure of the winding machine for manufacturing the coil tends to be complicated.

SUMMARY

A winding machine according to an example embodiment of the present disclosure includes a winding core around which a winding is wound, a first winding jig and a second winding jig positioned with the winding core interposed therebetween in an axial direction of a central axis of the winding core, and a first gripper and a second gripper that are located on an outer side of the winding core in a radial direction around the central axis. An outer edge portion of the first winding jig in the radial direction and an outer edge portion of the second winding jig in the radial direction are located on an outer side, in the radial direction, from the winding core. Each of the first gripper and the second gripper includes a pair of rollers to interpose and grip the winding. At least one of the first gripper or the second gripper is rotatable about the central axis.

A method of manufacturing a coil according to an example embodiment of the present disclosure includes winding a winding by using the winding machine described above.

The above and other elements, features, steps, characteristics and advantages of the present disclosure will become more apparent from the following detailed description of the example embodiments with reference to the attached drawings.

DETAILED DESCRIPTION

Figure 1:
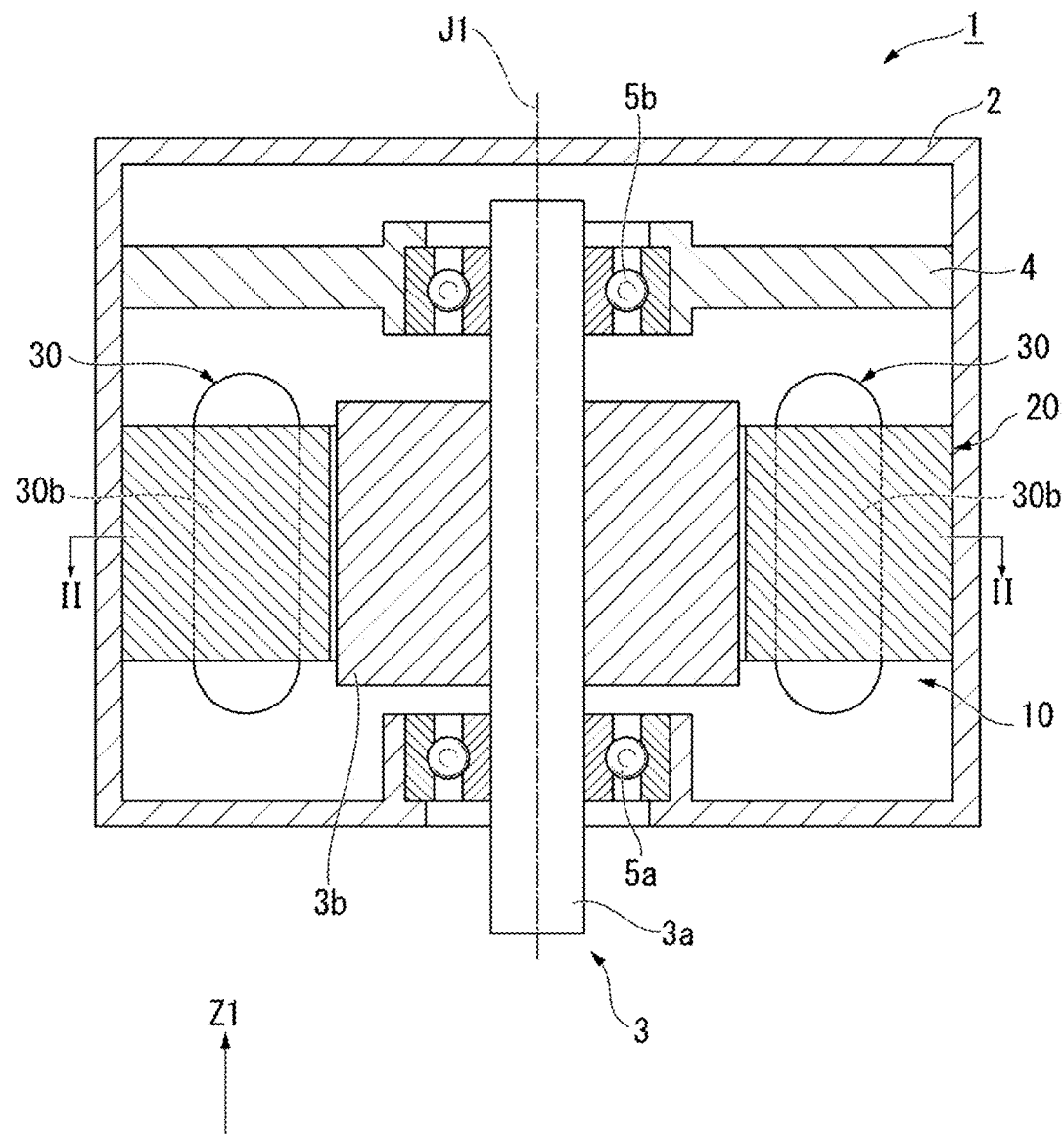
FIG. 1 is a cross-sectional view schematically illustrating a motor according to an example embodiment of the present disclosure.

As illustrated in FIG. 1, a motor 1 of the present example embodiment is an inner rotor type motor. The central axis of the motor 1 is a motor axis J1. The motor axis J1 is a virtual axis extending in one direction. In each drawing, a direction in which the motor axis J1 extends is indicated by a Z1 axis. In the following description, the axial direction of the motor axis J1 is referred to as a "motor axial direction", the radial direction centered on the motor axis J1 is referred to as a "motor radial direction", and the circumferential direction centered on the motor axis J1 is referred to as a "motor circumferential direction".

The motor 1 includes a housing 2, a rotor 3, a stator 10, a bearing holder 4, and bearings 5a and 5b. The housing 2 accommodates the rotor 3, the stator 10, the bearing holder 4, and the bearings 5a and 5b. The rotor 3 is rotatable about the motor axis J1. The rotor 3 includes a shaft 3a and a rotor main body 3b.

The shaft 3a extends in the motor axial direction along the motor axis J1. The shaft 3a has, for example, a columnar shape extending in the motor axial direction with the motor axis J1 as a center. The shaft 3a is rotatably supported about the motor axis J1 by the bearings 5a and 5b. The rotor main body 3b is fixed to an outer peripheral surface of the shaft 3a. Although not illustrated, the rotor main body 3b includes a rotor core fixed to the outer peripheral surface of the shaft 3a and a magnet fixed to the rotor core. The bearing holder 4 holds the bearing 5b.

Figure 2:
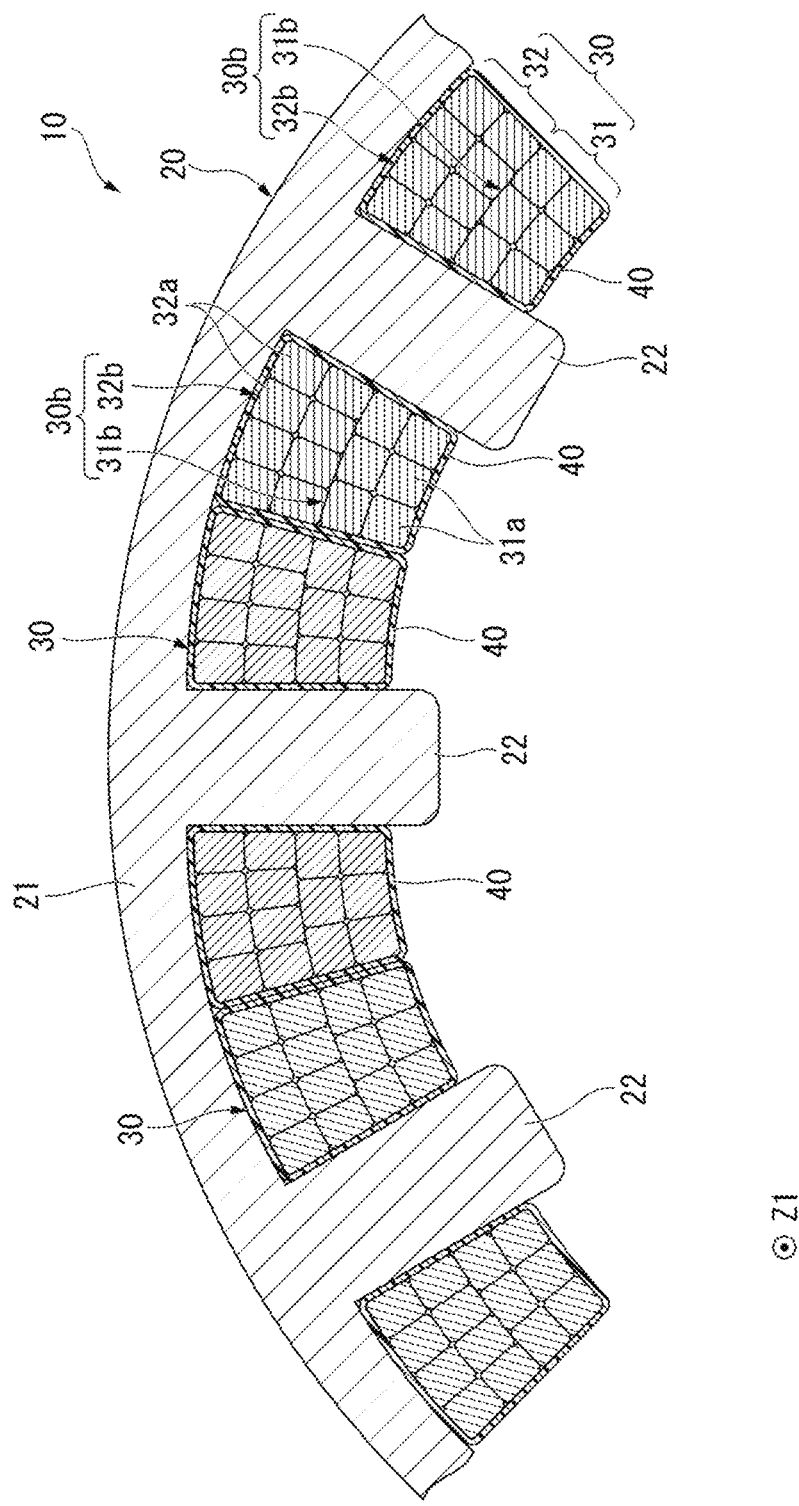
FIG. 2 is a cross-sectional view illustrating a portion of a stator of the present example embodiment, and is a cross-sectional view taken along line II-II in FIG. 1.

The stator 10 faces the rotor 3 in the motor radial direction with a gap interposed therebetween. In the present example embodiment, the stator 10 is located on the outer side of the rotor 3 in the motor radial direction. As illustrated in FIG. 2, the stator 10 includes a stator core 20, a plurality of coils 30, and an insulator 40. The stator core 20 includes an annular core back 21 surrounding the motor axis J1 and a plurality of teeth 22 extending to an inner side in the motor radial direction from the core back 21. The core back 21 has, for example, a cylindrical shape centered on the motor axis J1.

The plurality of teeth 22 are arranged at intervals along the motor circumferential direction. The plurality of teeth 22 are arranged at equal intervals over the entire circumference along the motor circumferential direction, for example. In the present example embodiment, the plurality of teeth 22 are formed integrally with the core back 21. Each of the teeth 22 has a substantially rectangular parallelepiped shape extending linearly along the motor radial direction. The dimension of the teeth 22 in the motor circumferential direction is substantially constant over the entire motor radial direction.

Note that an inner end portion of the tooth 22 in the motor radial direction may be provided with umbrella portions protruding to both sides in the motor circumferential direction. In addition, the tooth 22 may be a member separate from the core back 21. In this case, the tooth 22 may be fixed to the core back 21, for example, by press-fitting a protrusion provided at an end portion on the outer side of the teeth 22 in the motor radial direction into a concave portion provided on the inner surface of the core back 21 in the motor radial direction.

The plurality of coils 30 are attached to the plurality of teeth 22, respectively. In the present example embodiment, the coil 30 is attached to the tooth 22 via the insulator 40. Each tooth 22 passes through the inside of each coil 30 in the motor radial direction. The inner end portion of the teeth 22 in the motor radial direction protrudes to the inner side in the motor radial direction from the coils 30.

The coil 30 is configured by winding a flat wire. Therefore, the space factor of the coil 30 can be improved as compared with the case of using a round wire. In the present specification, the "flat wire" is a wire rod of which a cross-sectional shape is a quadrangular shape or a substantially quadrangular shape. In the present specification, the term "substantially quadrangular shape" includes a rounded quadrangular shape in which the corners of a quadrangular shape are rounded. Although not illustrated, the flat wire configuring the coil 30 in the present example embodiment is an enameled wire having an enamel coating on the surface.

The coil 30 includes a pair of axially extending portions 30b extending in the motor axial direction on both sides of the tooth 22, to which the coil 30 is attached, in the motor circumferential direction. The tooth 22 is interposed between the pair of axially extending portions 30b in the motor circumferential direction. The axially extending portion 30b is configured by bundling a plurality of flat wires configuring the coil 30. The contour shape of the axially extending portion 30b in the cross section orthogonal to the motor axial direction is, for example, a fan shape in which the dimension in the motor circumferential direction decreases toward the inner side in the motor radial direction.

The term "fan shape" as used herein involves a shape surrounded by two arcs that are equal in center of curvature to each other and are different in radius from each other, and two line segments extending in radius directions of circles with their centers aligned with the centers of curvature and respectively connecting to opposite ends of the two arcs. In addition, the term "fan shape" as used herein involves a strictly fan shape and a substantially fan shape. The term "substantially fan shape" as used herein involves a shape in which fan-shaped arcs are approximated by a plurality of line segments. In the present example embodiment, the contour shape of the axially extending portion 30b in the cross section orthogonal to the motor axial direction is a shape surrounded by the two arcs and two line segments as described above. Although not illustrated, the center of curvature of the contour shape of the axially extending portion 30b in the cross section orthogonal to the motor axial direction is located on the inner side of the core back 21 in the motor radial direction and is located at a position different from the motor axis J1.

The coil 30 includes a first winding body 31 and a second winding body 32. Each of the first winding body 31 and the second winding body 32 is configured by winding a flat wire. In the present example embodiment, the first winding body 31 configures the inner portion of the coil 30 in the motor radial direction. In the present example embodiment, the second winding body 32 configures the outer portion of the coil 30 in the motor radial direction. That is, the second winding body 32 is located on the outer side of the first winding body 31 in the motor radial direction.

Figure 3:
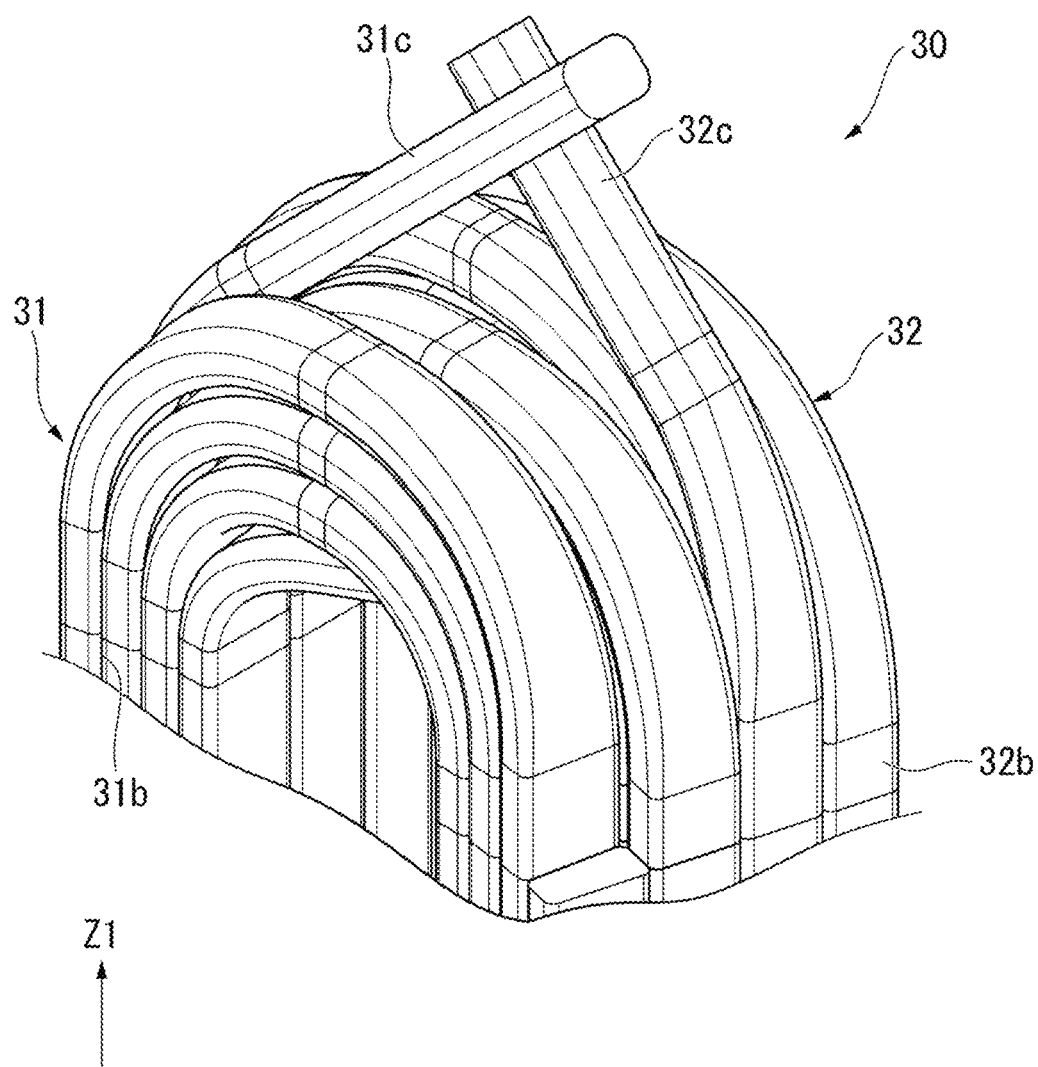
FIG. 3 is a perspective view illustrating a portion of a coil of the present example embodiment.

The second winding body 32 is connected to the first winding body 31. More specifically, as illustrated in FIG. 3, one end portion 31c of the flat wire configuring the first winding body 31 is connected to one end portion 32c of the flat wire configuring the second winding body 32. Accordingly, first winding body 31 and second winding body 32 are connected in series to configure one coil 30. A method of connecting the one end portion 31c and the one end portion 32c is not particularly limited. The one end portion 31c and the one end portion 32c may be fixed by solder, may be fixed by laser welding, or may be fixed by ultrasonic bonding. In addition, the one end portion 31c and the one end portion 32c may be provided with concave portions that mesh with each other.

In the following description, N is a freely-selected integer of 1 or more, and M is a freely-selected integer larger than N. At this time, the first winding body 31 is an N-layer winding body aligned and wound in two rows aligned in the motor radial direction. The second winding body 32 is an M-layer winding body aligned and wound in two rows aligned in the motor radial direction. As illustrated in FIG. 2, in the present example embodiment, the first winding body 31 is configured by stacking three layers of windings aligned and wound in two rows aligned in the motor radial direction. That is, in the present example embodiment, N is 3, and the first winding body 31 is a three-layer winding body aligned and wound in two rows aligned in the motor radial direction. Accordingly, the total number of windings of the first winding body 31 is six.

In the present example embodiment, the second winding body 32 is configured by stacking four layers of windings aligned and wound in two rows aligned in the motor radial direction. That is, in the present example embodiment, M is 4, and the second winding body 32 is a four-layer winding body aligned and wound in two rows aligned in the motor radial direction. Accordingly, the total number of windings of the second winding body 32 is eight. Therefore, the total number of windings of the coil 30 is fourteen.

The first winding body 31 has a pair of first axially extending portions 31b extending in the motor axial direction on both sides of the tooth 22, to which the first winding body 31 is attached, in the motor circumferential direction. The contour shape of the first axially extending portion 31b in the cross section orthogonal to the motor axial direction is, for example, a fan shape in which the dimension in the motor circumferential direction decreases toward the inner side in the motor radial direction. More specifically, the contour shape of the first axially extending portion 31b in the cross section orthogonal to the motor axial direction is a shape surrounded by two arcs and two line segments, similarly to the axially extending portion 30b described above.

In the present example embodiment, the cross-sectional shape of the portion configuring the first axially extending portion 31b among the flat wires configuring the first winding body 31 is a trapezoidal shape in which the dimension in the motor circumferential direction decreases toward the inner side in the motor radial direction. More specifically, the cross-sectional shape of the portion configuring the first axially extending portion 31b among the flat wires configuring the first winding body 31 is a rounded trapezoidal shape in which the dimension in the motor circumferential direction decreases toward the inner side in the motor radial direction. In the following description, a portion configuring the first axially extending portion 31b among the flat wires configuring the first winding body 31 is referred to as a first coil wire portion 31a.

Each of the pair of first axially extending portions 31b is configured by bundling a plurality of first coil wire portions 31a. In the present example embodiment, each of the first axially extending portions 31b is configured by bundling six first coil wire portions 31a. More specifically, in the present example embodiment, two rows of the first axially extending portions 31b are configured to be arranged in the motor radial direction, each row having three first coil wire portions 31a arranged in the motor circumferential direction. The dimension in the motor circumferential direction in the cross section of the first coil wire portion 31a configuring the row on the outer side in the motor radial direction among the two rows aligned in the motor radial direction is larger than the dimension in the motor circumferential direction in the cross section of the first coil wire portion 31a configuring the row on the inner side in the motor radial direction. The dimension in the motor radial direction in the cross section of the first coil wire portion 31a configuring the row on the outer side in the motor radial direction is smaller than the dimension in the motor radial direction in the cross section of the first coil wire portion 31a configuring the row on the inner side in the motor radial direction. The cross-sectional areas of the first coil wire portions 31a are the same.

The second winding body 32 has a pair of second axially extending portions 32b extending in the motor axial direction on both sides of the tooth 22, to which the second winding body 32 is attached, in the motor circumferential direction. The pair of second axially extending portions 32b is arranged adjacent to the outer sides of the pair of first axially extending portions 31b in the motor radial direction, respectively. The first axially extending portion 31b and the second axially extending portion 32b adjacent in the motor radial direction configure the axially extending portion 30b of the coil 30. That is, the axially extending portion 30b includes the first axially extending portion 31b provided on the first winding body 31 and the second axially extending portion 32b provided on the second winding body 32.

The contour shape of the second axially extending portion 32b in the cross section orthogonal to the motor axial direction is, for example, a fan shape in which the dimension in the motor circumferential direction decreases toward the inner side in the motor radial direction. More specifically, the contour shape of the second axially extending portion 32b in the cross section orthogonal to the motor axial direction is a shape surrounded by two arcs and two line segments, similarly to the axially extending portion 30b described above.

In the present example embodiment, the cross-sectional shape of the portion configuring the second axially extending portion 32b among the flat wires configuring the second winding body 32 is a trapezoidal shape in which the dimension in the motor circumferential direction decreases toward the inner side in the motor radial direction. More specifically, the cross-sectional shape of the portion configuring the second axially extending portion 32b among the flat wires configuring the second winding body 32 is a rounded trapezoidal shape in which the dimension in the motor circumferential direction decreases toward the inner side in the motor radial direction. In the following description, the portion configuring the second axially extending portion 32b among the flat wires configuring the second winding body 32 is referred to as a second coil wire portion 32a.

Each of the pair of second axially extending portions 32b is configured by bundling a plurality of second coil wire portions 32a. In the present example embodiment, each of the second axially extending portions 32b is configured by bundling eight second coil wire portions 32a. More specifically, in the present example embodiment, two rows of the second axially extending portions 32b are configured to be arranged in the motor radial direction, each row having four second coil wire portions 32a arranged in the motor circumferential direction. The dimension in the motor circumferential direction in the cross section of the second coil wire portion 32a configuring the row on the outer side in the motor radial direction among the two rows aligned in the motor radial direction is larger than the dimension in the motor circumferential direction in the cross section of the second coil wire portion 32a configuring the row on the inner side in the motor radial direction. The dimension in the motor circumferential direction in the cross section of the second coil wire portion 32a is smaller than the dimension in the motor circumferential direction in the cross section of the first coil wire portion 31a.

The dimension in the motor radial direction in the cross section of the second coil wire portion 32a configuring the row on the outer side in the motor radial direction is smaller than the dimension in the motor radial direction in the cross section of the second coil wire portion 32a configuring the row on the inner side in the motor radial direction. The dimension in the motor radial direction in the cross section of the second coil wire portion 32a is larger than the dimension in the motor radial direction in the cross section of the first coil wire portion 31a. The cross-sectional areas of the second coil wire portions 32a are the same.

As illustrated in FIG. 3, one end portion 31c connected to the second winding body 32 is obliquely drawn out from one of the pair of first axially extending portions 31b to one side (+Z1 side) in the motor axial direction. The one end portion 32c connected to the first winding body 31 is obliquely drawn out from one of the pair of second axially extending portions 32b to one side in the motor axial direction. The first axially extending portion 31b from which the one end portion 31c is drawn out and the second axially extending portion 32b from which the one end portion 32c is drawn out are located on opposite sides with the tooth 22 interposed therebetween in the motor circumferential direction.

Although not illustrated, the cross-sectional shape of a portion configuring a portion other than the first axially extending portion 31b in the flat wire configuring the first winding body 31 is, for example, a rounded square shape. The cross-sectional shape of a portion configuring a portion other than the second axially extending portion 32b in the flat wire configuring the second winding body 32 is, for example, a rounded square shape.

As illustrated in FIG. 2, the insulator 40 is, for example, a sheet-shaped insulating member. The insulators 40 may be an insulating tape or an insulating sheet of paper. In the present example embodiment, the insulator 40 is provided for each of the pair of axially extending portions 30b. The insulator 40 is wound around each of the pair of axially extending portions 30b. The insulator 40 provided on the axially extending portion 30b surrounds the axially extending portion 30b in a cross section orthogonal to the motor axial direction. Although not illustrated, the insulator 40 is provided over substantially the entire axially extending portion 30b in the motor axial direction.

Figure 4:
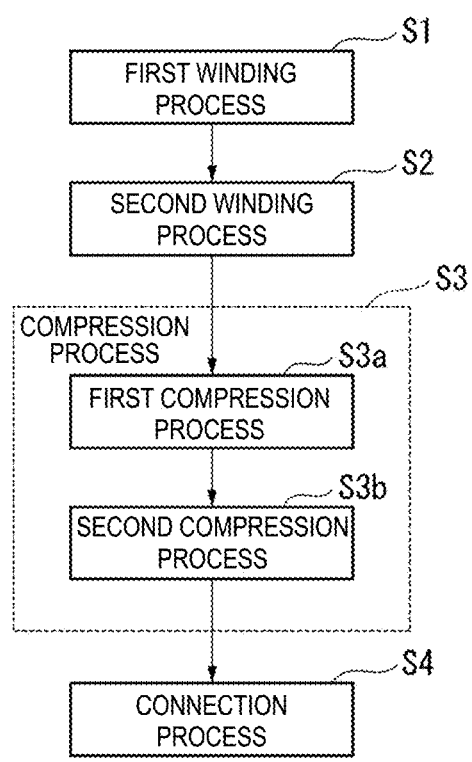
FIG. 4 is a flowchart illustrating a procedure in a method of manufacturing the coil of the present example embodiment.
Figure 5:
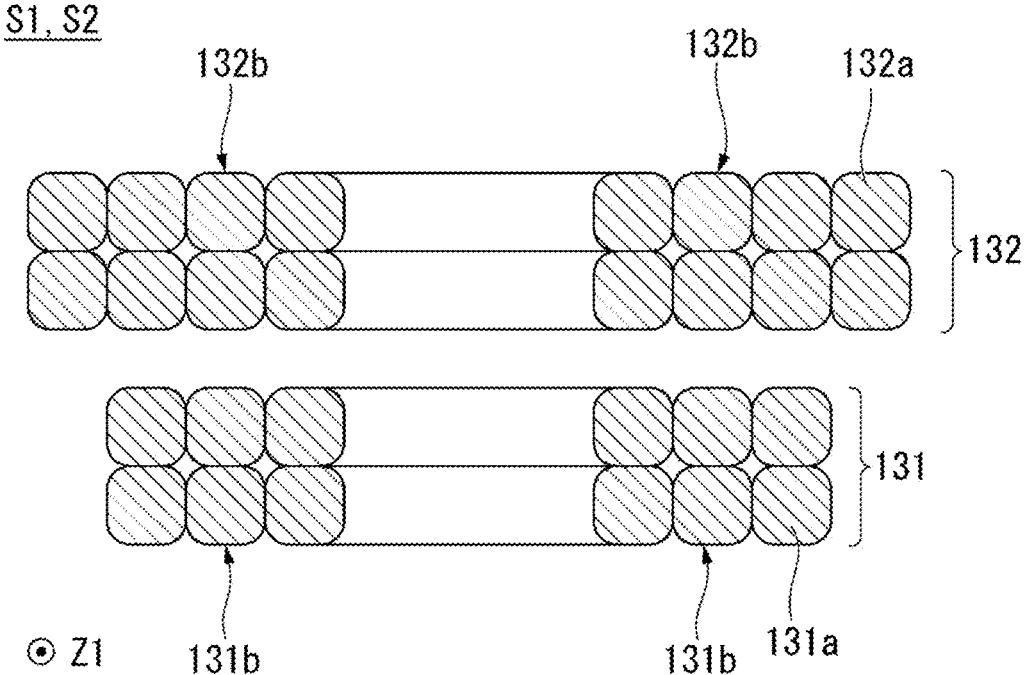
FIG. 5 is a cross-sectional view illustrating a portion of the procedure in the method of manufacturing the coil of the present example embodiment.

As illustrated in FIG. 4, a method of manufacturing the coil 30 includes a first winding process S1, a second winding process S2, a compression process S3, and a connection process S4. As illustrated in FIG. 5, the first winding process S1 is a process of winding a flat wire to form a first winding body 131. The second winding process S2 is a process of winding a flat wire to form a second winding body 132. Either the first winding process S1 or the second winding process S2 may be performed first, or may be performed simultaneously.

The first winding body 131 is a winding body before becoming the first winding body 31 described above. In the first winding body 131, each cross-sectional shape of a plurality of first coil wire portions 131a configuring a first axially extending portion 131b is a rounded square shape. The contour shape of the first axially extending portion 131b in the cross section orthogonal to the motor axial direction is, for example, a substantially rectangular shape. The cross-sectional shape of the flat wire configuring the first winding body 131 is the same in any portion. The first winding body 131 is a three-layer winding body aligned and wound in two rows aligned in the motor radial direction.

The second winding body 132 is a winding body before becoming the second winding body 32 described above. In the second winding body 132, each cross-sectional shape of a plurality of second coil wire portions 132a configuring a second axially extending portion 132b is a rounded square shape. The contour shape of the second axially extending portion 132b in the cross section orthogonal to the motor axial direction is, for example, a substantially rectangular shape. The cross-sectional shape of the flat wire configuring the second winding body 132 is the same in any portion. The cross-sectional shape of the flat wire configuring the second winding body 132 is the same as the cross-sectional shape of the flat wire configuring the first winding body 131. The second winding body 132 is a four-layer winding body aligned and wound in two rows aligned in the motor radial direction.

Figure 6:
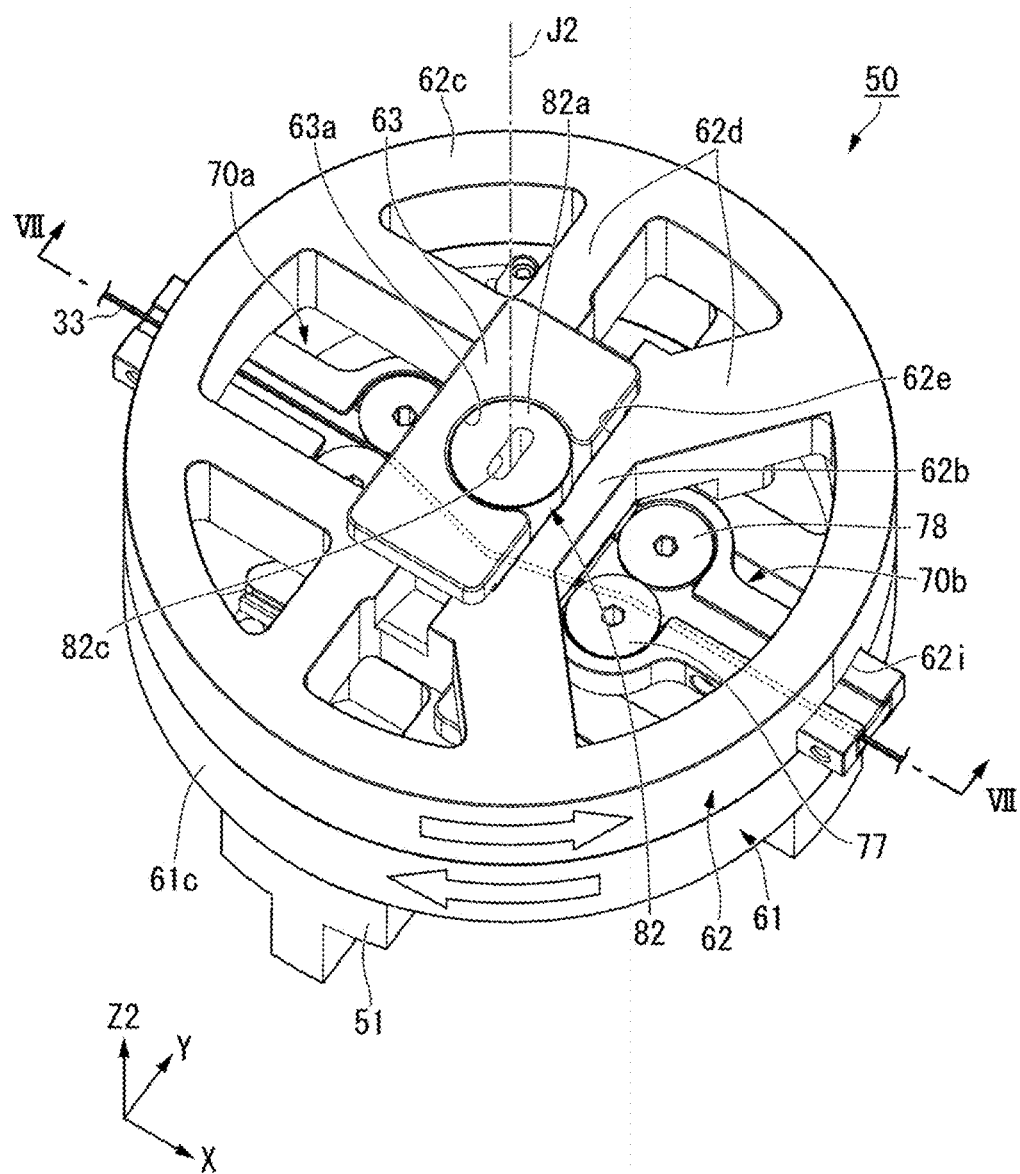
FIG. 6 is a perspective view illustrating the winding machine of the present example embodiment.
Figure 7:
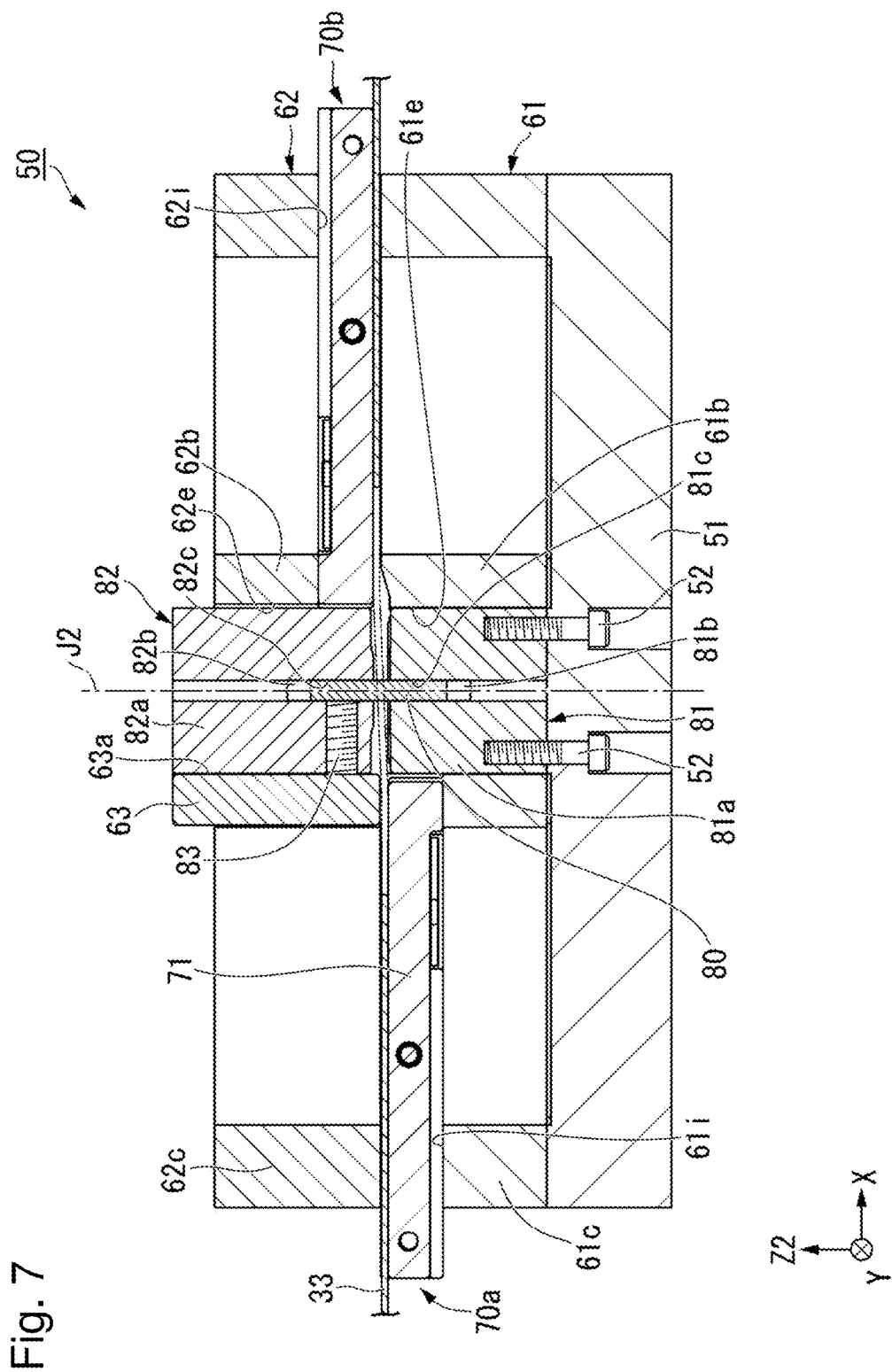
FIG. 7 is a cross-sectional view illustrating the winding machine of the present example embodiment, and is a cross-sectional view taken along line VII-VII in FIG. 6.
Figure 8:
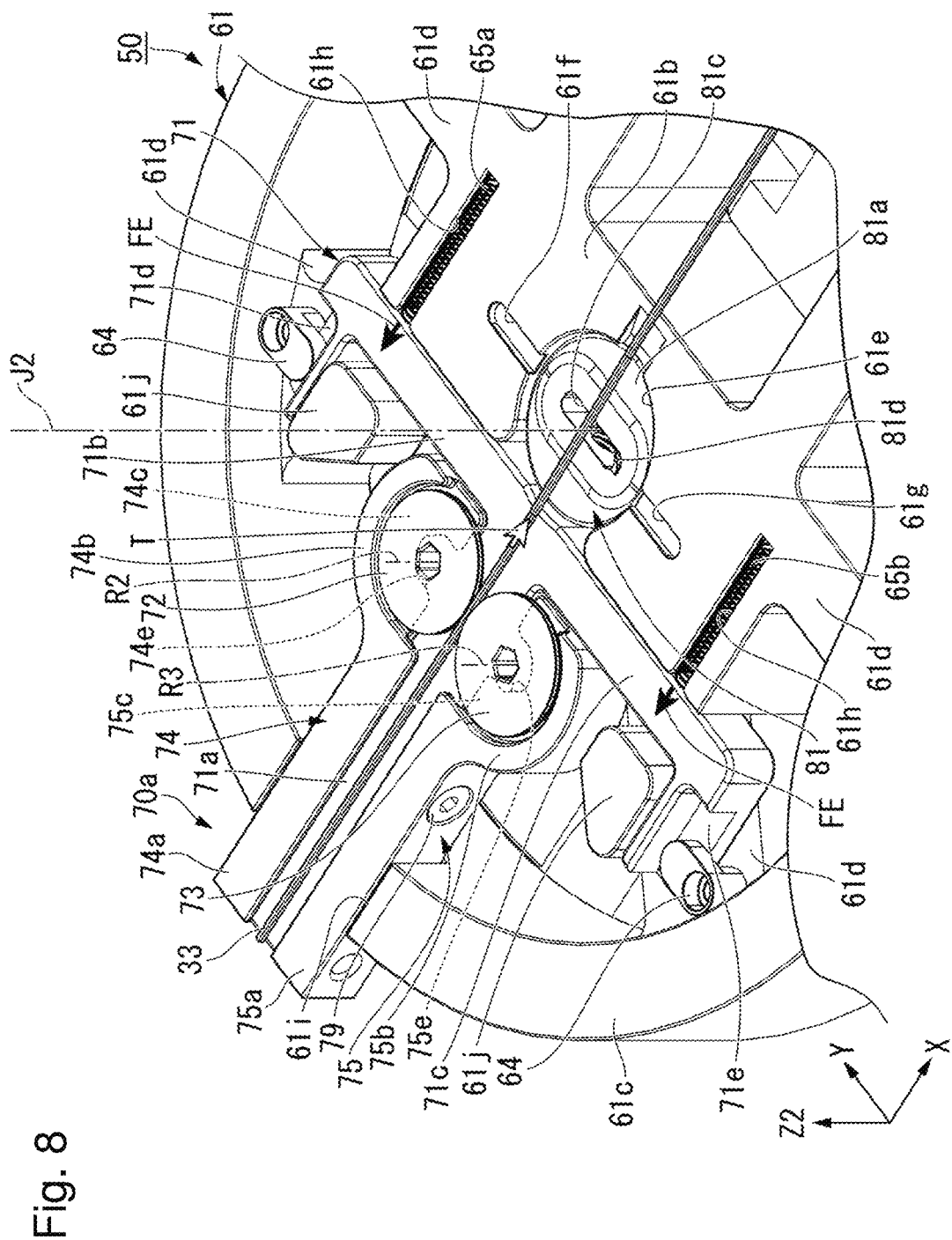
FIG. 8 is a perspective view illustrating a state in the middle of assembly of the winding machine of the present example embodiment.
Figure 9:
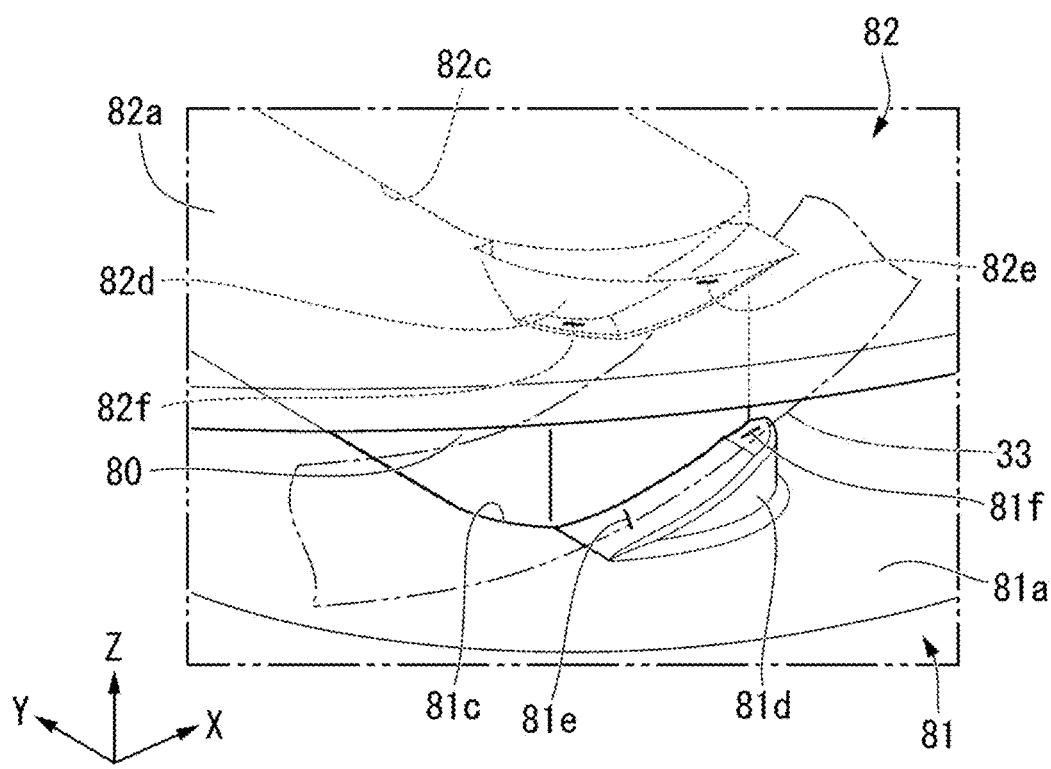
FIG. 9 is a perspective view illustrating a first guide portion and a second guide portion of the present example embodiment.

In the present example embodiment, the first winding process S1 and the second winding process S2 are performed by using the winding machine 50 illustrated in FIGS. 6 to 11. That is, the first winding process S1 and the second winding process S2 are processes of winding the winding 33 using the winding machine 50. In the present example embodiment, the winding 33 is a flat wire. As illustrated in FIG. 7, the winding machine 50 of the present example embodiment includes a base member 51, a first holder 61, a second holder 62, a bearing member 63, a first gripper 70a, a second gripper 70b, a winding core 80, a first winding jig 81, and a second winding jig 82. In addition, as illustrated in FIG. 8, the winding machine 50 includes elastic portions 65a and 65b. In addition, as illustrated in FIG. 9, the winding machine 50 includes a first guide portion 81d and a second guide portion 82d.

In FIGS. 6 to 16, a direction parallel to the central axis J2 of the winding core 80 is indicated by a Z2 axis. In the following description, unless otherwise specified, the axial direction of the central axis J2 is simply referred to as an "axial direction", the radial direction centered on the central axis J2 is simply referred to as a "radial direction", and the circumferential direction around the central axis J2 is simply referred to as a "circumferential direction". In addition, a positive side (+Z side) of the 22 axis in the axial direction is referred to as an "upper side", and a negative side (−Z side) of the 22 axis in the axial direction is referred to as a lower side. In the present example embodiment, the upper side corresponds to "one side in the axial direction", and the lower side corresponds to "the other side in the axial direction".

A direction parallel to the X axis shown in each drawing among the directions orthogonal to the axial direction is referred to as a "left-right direction X", and a direction parallel to the Y axis shown in each drawing among the directions orthogonal to the axial direction is referred to as a "front-rear direction Y". The left-right direction X and the front-rear direction Y are directions orthogonal to each other. A positive side (+X side) in the left-right direction X is referred to as a "right side", and a negative side (−X side) in the left-right direction X is referred to as a "left side". A positive side (+Y side) in the front-rear direction Y is referred to as a "front side", and a negative side (−Y side) in the front-rear direction Y is referred to as a "rear side".

Note that the left-right direction, the front-rear direction, the upper side, the lower side, the right side, the left side, the front side, and the rear side are merely used for describing arrangement and other relationships between each part. The actual arrangement and other relationships may include those other than the relationships indicated by these terms.

The positional relationship of each part of the winding machine 50 will be described below with respect to an initial state before the winding 33 is attached to the winding machine 50, and the winding of the winding 33 is started. FIGS. 6 and 7 illustrate the winding machine 50 in the initial state.

As illustrated in FIGS. 6 and 7, the base member 51 expands in a direction orthogonal to the axial direction. As illustrated in FIG. 7, the first winding jig 81 is fixed to the central portion of the base member 51 by a bolt 52.

The first winding jig 81 has a columnar shape extending in the axial direction. The first winding jig 81 has, for example, a columnar shape centered on the central axis J2. The first winding jig 81 protrudes to the upper side from the central portion of the base member 51. The first winding jig 81 includes a first winding jig body 81a and a first support portion 81b.

The first winding jig body 81a has a columnar shape centered on the central axis J2. The first winding jig body 81a has a first hole 81c recessed to the lower side from the upper surface of the first winding jig body 81a. In the present example embodiment, the first hole 81c penetrates the first winding jig body 81*a* in the axial direction. The central axis J2 passes through the inside of the first hole 81*c*. As illustrated in FIG. 8, the first hole 81*c* is, for example, a rounded rectangular hole long in the front-rear direction Y. Note that the first hole 81*c* may be a hole having a bottom portion on the lower side.

As illustrated in FIG. 7, the first support portion 81*b* is located inside the first hole 81*c*. The first support portion 81*b* protrudes to the radially inner side from the inner peripheral surface of the first hole 81*c*, for example. The first support portion 81*b* is located, for example, in a portion closer to the upper side of the inside of the first hole 81*c*.

In the present example embodiment, the second winding jig 82 is located on the upper side of the first winding jig 81. The first winding jig 81 and the second winding jig 82 are arranged with the winding core 80 interposed therebetween in the axial direction. The second winding jig 82 is arranged on the upper side of the first winding jig 81 with a gap therebetween. The interval between the first winding jig 81 and the second winding jig 82 in the axial direction is larger than two times the thickness of the winding 33 and smaller than three times the thickness of the winding 33. The second winding jig 82 has a columnar shape extending in the axial direction. The second winding jig 82 has, for example, a columnar shape centered on the central axis J2. The outer diameter of the second winding jig 82 is, for example, the same as the outer diameter of the first winding jig 81. The second winding jig 82 includes a second winding jig body 82*a* and a second support portion 82*b*.

The second winding jig body 82*a* has a columnar shape centered on the central axis J2. The second winding jig body 82*a* has a second hole 82*c* recessed to the upper side from the lower surface of the second winding jig body 82*a*. In the present example embodiment, the second hole 82*c* penetrates the second winding jig body 82*a* in the axial direction. The central axis J2 passes through the inside of the second hole 82*c*. As illustrated in FIG. 6, the second hole 82*c* is, for example, a rounded rectangular hole long in the front-rear direction Y. Note that the second hole 82*c* may be a hole having a bottom portion on the upper side.

As illustrated in FIG. 7, the second support portion 82*b* is located inside the second hole 82*c*. The second support portion 82*b* protrudes to the radially inner side from the inner peripheral surface of the second hole 82*c*, for example. The second support portion 82*b* is located, for example, in a portion closer to the lower side of the inside of the second hole 82*c*.

Figure 12:
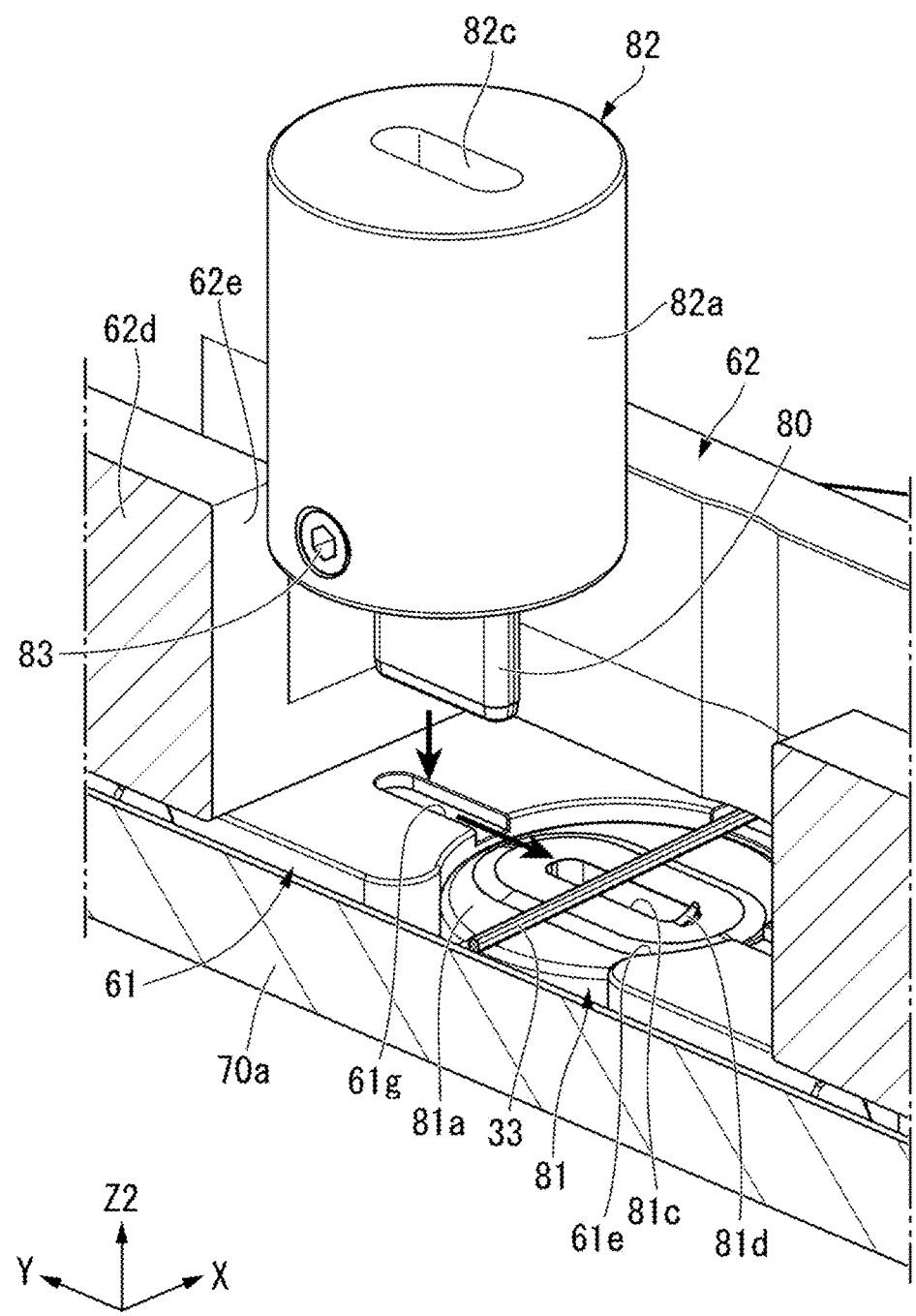
FIG. 12 is a perspective cross-sectional view illustrating a portion of an assembly procedure of the winding machine of the present example embodiment.

The winding 33 is wound around the winding core 80. The winding core 80 has a columnar shape extending in the axial direction with the central axis J2 as the center. As illustrated in FIG. 12, the winding core 80 has, for example, a substantially quadrangular prism shape which is long in the front-rear direction Y and flat in the left-right direction X. As illustrated in FIG. 7, the winding core 80 is located between the first winding jig 81 and the second winding jig 82 in the axial direction. The lower portion of the winding core 80 is inserted into the first hole 81*c* from above. The lower portion of the winding core 80 is fitted into the first hole 81*c*. The upper portion of the winding core 80 is inserted into the second hole 82*c* from below. The upper portion of the winding core 80 is fitted into the second hole 82*c*.

The upper portion of the winding core 80 is fixed to the second winding jig 82, for example, by a hexagon socket set screw 83. The hexagon socket set screw 83 is fastened to the radially inner side from the outer peripheral surface of the second winding jig 82. The radially inner end portion of the hexagon socket set screw 83 is pressed against the side surface of the winding core 80 in the left-right direction X. The central portion of the winding core 80 in the axial direction is exposed to a gap in the axial direction between the first winding jig 81 and the second winding jig 82.

The lower end portion of the winding core 80 is in contact with the first support portion 81*b* from above in the first hole 81*c*. The upper end portion of the winding core 80 is in contact with the second support portion 82*b* from below in the second hole 82*c*. Accordingly, the winding core 80, the first winding jig 81, and the second winding jig 82 are positioned in the axial direction. The first winding jig 81 and the second winding jig 82 protrude to the radially outer side from the winding core 80. That is, the radially outer edge portion of the first winding jig 81 and the radially outer edge of the second winding jig 82 are located on the radially outer side from the winding core 80.

As illustrated in FIG. 9, the first guide portion 81*d* is located around the winding core 80. In the present example embodiment, the first guide portion 81*d* protrudes from the first winding jig 81 toward the second winding jig 82. More specifically, the first guide portion 81*d* protrudes to the upper side from the peripheral edge portion of the first hole 81*c* of the upper surface of the first winding jig body 81*a*. The first guide portion 81*d* and the first winding jig 81 are, for example, a part of the same single member. The first guide portion 81*d* is located, for example, on the rear side (−Y side) of the first hole 81*c*. The radially inner surface of the first guide portion 81*d* is in contact with the outer peripheral surface of the winding core 80. That is, the first guide portion 81*d* is connected to the outer peripheral surface of the winding core 80. The radially outer surface of the first guide portion 81*d* has, for example, the same shape as the shape of the portion, which is in contact with the first guide portion 81*d*, of the outer peripheral surface of the winding core 80 when viewed in the axial direction. The radially outer surface of the first guide portion 81*d* is, for example, a curved surface slightly curved in a direction protruding toward the rear side.

The first guide portion 81*d* has a first guide surface 81*e* and a first top surface 81*f*. The first guide surface 81*e* is a surface facing to the upper side. The first guide surface 81*e* is an inclined surface located closer to the upper side toward one side in the circumferential direction. In the present example embodiment, one side in the circumferential direction is a side that advances counterclockwise around the central axis J2 when viewed from above. The first top surface 81*f* is connected to the end portion of the first guide surface 81*e* on one side in the circumferential direction. In the first top surface 81*f*, the first top surface 81*f* is, for example, a flat surface that faces to the upper side and is orthogonal to the axial direction. In the present example embodiment, the first guide surface 81*e* and the first top surface 81*f* configure the upper surface of the first guide portion 81*d*.

The second guide portion 82*d* is located around the winding core 80. In the present example embodiment, the second guide portion 82*d* protrudes from the second winding jig 82 toward the first winding jig 81. More specifically, the second guide portion 82*d* protrudes to the lower side from the peripheral edge portion of the second hole 82*c* of the lower surface of the second winding jig body 82*a*. The second guide portion 82*d* and the second winding jig 82 are, for example, a part of the same single member. The second guide portion 82*d* is located, for example, on the rear side (−Y side) of the second hole 82*c*. The radially inner surface of the second guide portion 82*d* is in contact with the outer peripheral surface of the winding core 80. That is, the second guide portion 82d is connected to the outer peripheral surface of the winding core 80. The radially outer surface of the second guide portion 82d has, for example, the same shape as the shape of the portion, which is in contact with the second guide portion 82d, of the outer peripheral surface of the winding core 80 when viewed in the axial direction. The radially outer surface of the second guide portion 82d is, for example, a curved surface slightly curved in a direction protruding toward the rear side.

The second guide portion 82d has a second guide surface 82e and a second top surface 82f. The second guide surface 82e is a surface facing to the lower side. The second guide surface 82e is an inclined surface located closer to the upper side toward one side in the circumferential direction. The shape of the second guide surface 82e is similar to the shape of the first guide surface 81e. The first guide surface 81e and the second guide surface 82e are arranged to face each other with a gap interposed therebetween in the axial direction.

The second top surface 82f is connected to the end portion of the second guide surface 82e on the other side in the circumferential direction. In the present example embodiment, the other side in the circumferential direction is a side that advances clockwise around the central axis J2 when viewed from above. The second top surface 82f is, for example, a flat surface that faces to the lower side and is orthogonal to the axial direction. The first top surface 81f and the second top surface 82f are arranged apart from each other in the circumferential direction. A part of the first top surface 81f overlaps, for example, an end portion of the second guide surface 82e on one side in the circumferential direction when viewed in the axial direction. A part of the second top surface 82f overlaps, for example, an end portion of the first guide surface 81e on the other side in the circumferential direction when viewed in the axial direction. The first guide portion 81d and the second guide portion 82d are arranged in attitudes opposite to each other in the axial direction, but have shapes similar to each other, for example.

As illustrated in FIGS. 7 and 8, the first holder 61 is a member that holds the first gripper 70a. The first holder 61 is located on the upper side of the base member 51. The first holder 61 is supported from below by the base member 51. As illustrated in FIG. 8, the first holder 61 has an annular shape surrounding the first winding jig 81. The outer peripheral surface of the first holder 61 has, for example, an annular shape centered on the central axis J2. The first holder 61 includes a first annular portion 61c, a first bearing portion 61b, a plurality of first connection portions 61d, and a pair of protruding wall portions 61j.

The first annular portion 61c has an annular shape surrounding the central axis J2. The first annular portion 61c has, for example, an annular shape centered on the central axis J2. The first annular portion 61c has a first guide hole 61i that penetrates the left (−X side) end portion of the first annular portion 61c in the left-right direction X. The first guide hole 61i opens to the upper side.

The first bearing portion 61b is located to be separated on the radially inner side of the first annular portion 61c. The first bearing portion 61b has, for example, a substantially rectangular shape long in the front-rear direction Y when viewed in the axial direction. The first bearing portion 61b has a first bearing hole 61e axially penetrating the first bearing portion 61b. The first bearing hole 61e is a substantially circular hole centered on the central axis J2. The first bearing hole 61e opens to the left side (−X side), for example. The first winding jig 81 is fitted to the radially inner side of the first bearing hole 61e. The first winding jig 81 rotatably supports the first holder 61 about the central axis J2 via the inner peripheral surface of the first bearing hole 61e. In the present example embodiment, the first holder 61 is bidirectionally rotatable about the central axis J2.

The first bearing portion 61b has a pair of guide grooves 61f and 61g. The guide grooves 61f and 61g are recessed to the lower side from the upper surface of the first bearing portion 61b and extend in the front-rear direction Y. The guide groove 61f and the guide groove 61g are arranged with the central axis J2 interposed therebetween in the front-rear direction Y. The guide groove 61f is located on the front side (+Y side) of the first bearing hole 61e. The rear (−Y side) end portion of the guide groove 61f opens to the inside of the first bearing hole 61e. The guide groove 61g is located on the rear side of the first bearing hole 61e. The end portion of the guide groove 61g on the front side opens to the radially inner side of the first bearing hole 61e.

The first bearing portion 61b has a pair of accommodation grooves 61h. The accommodation groove 61h is recessed to the lower side from the upper surface of the first bearing portion 61b and extends in the left-right direction X. The left (−X side) end portion of the accommodation groove 61h opens to the left side surface of the first bearing portion 61b. The pair of accommodation grooves 61h is arranged with the first bearing hole 61e interposed therebetween in the front-rear direction Y. The pair of accommodation grooves 61h is located on the radially outer side from the pair of guide grooves 61f and 61g. Each of the elastic portions 65a and 65b is accommodated in each of the pair of accommodation grooves 61h. The elastic portions 65a and 65b are, for example, coil springs extending in the left-right direction X. The width of the pair of accommodation grooves 61h in the front-rear direction Y is narrowed at the upper opening portion. Accordingly, the elastic portions 65a and 65b are suppressed from coming out to the upper side from the accommodation groove 61h.

The plurality of first connection portions 61d are located between the first bearing portion 61b and the first annular portion 61c in the radial direction. The plurality of first connection portions 61d connect the first bearing portion 61b and the first annular portion 61c. The plurality of first connection portions 61d extend from the radially outer surface of the first bearing portion 61b to the radially inner surface of the first annular portion 61c. The plurality of first connection portions 61d is arranged at intervals in the circumferential direction.

The pair of protruding wall portions 61j protrudes to the upper side from different first connection portions 61d. The pair of protruding wall portions 61j is arranged apart from each other on the left side (−X side) of the first bearing portion 61b. Each of the pair of protruding wall portions 61j is arranged apart from the left side of each of the pair of accommodation grooves 61h. The pair of protruding wall portions 61j is arranged with a pair of rollers 72 and 73 described later interposed therebetween in the front-rear direction Y.

The first holder 61 includes a pair of pressing members 64 arranged with a pair of protruding wall portions 61j interposed in the front-rear direction Y. The pair of pressing members 64 is fixed to the upper surfaces of the first connection portions 61d different from each other. The pressing member 64 is fixed to the first connection portion 61d by, for example, a bolt.

The second holder 62 is a member which holds the second gripper 70b. As illustrated in FIG. 7, the second holder 62 is located on the upper side of the first holder 61. The second holder 62 is supported from below by the first holder 61. As illustrated in FIG. 6, the second holder 62 has an annular shape surrounding the second winding jig 82. The upper end portion of the second winding jig 82 protrudes to the upper side from the upper surface of the second holder 62, for example. The outer peripheral surface of the second holder 62 has, for example, an annular shape centered on the central axis J2. The outer diameter of the second holder 62 is, for example, the same as the outer diameter of the first holder 61. The second holder 62 includes a second annular portion 62c, a second bearing portion 62b, and a plurality of second connection portions 62d.

The second annular portion 62c has an annular shape surrounding the central axis J2. The second annular portion 62c has, for example, an annular shape centered on the central axis J2. The second annular portion 62c overlaps the first annular portion 61c when viewed in the axial direction. The second annular portion 62c has a second guide hole 62i penetrating the right (+X side) end portion of the second annular portion 62c in the left-right direction X. The second guide hole 62i opens to the lower side.

The second bearing portion 62b is located on the radially inner side of the second annular portion 62c. The second bearing portion 62b has, for example, a substantially rectangular shape long in the front-rear direction Y when viewed in the axial direction. The second bearing portion 62b has a fitting hole 62e axially penetrating the second bearing portion 62b. The fitting hole 62e is, for example, a rectangular hole long in the front-rear direction Y. Although not illustrated, the second bearing portion 62b has a pair of accommodation grooves on the lower surface. An elastic portion (not illustrated) is accommodated in each of the accommodation grooves of the second bearing portion 62b.

The plurality of second connection portions 62d are located between the second bearing portion 62b and the second annular portion 62c in the radial direction. The plurality of second connection portions 62d connect the second bearing portion 62b and the second annular portion 62c. The plurality of second connection portions 62d extend from the radially outer surface of the second bearing portion 62b to the radially inner surface of the second annular portion 62c. The plurality of second connection portions 62d is arranged at intervals in the circumferential direction.

The bearing member 63 is a substantially rectangular parallelepiped member long in the front-rear direction Y. The bearing member 63 is fitted into the fitting hole 62e. The bearing member 63 is attached to the second holder 62 to be relatively non-rotatable about the central axis J2. The upper end portion of the bearing member 63 protrudes to the upper side from the upper surface of the second holder 62.

The bearing member 63 has a second bearing hole 63a axially penetrating the bearing member 63. The second bearing hole 63a is a substantially circular hole centered on the central axis J2. The second bearing hole 63a opens to the right side (+X side), for example. The second winding jig 82 is fitted to the radially inner side of the second bearing hole 63a. The second winding jig 82 supports the bearing member 63 and the second holder 62 via the inner peripheral surface of the second bearing hole 63a to be rotatable about the central axis J2. In the present example embodiment, the second holder 62 is bidirectionally rotatable about the central axis J2. Accordingly, the first holder 61 and the second holder 62 are rotatable about the central axis J2 in directions opposite to each other.

As illustrated in FIG. 7, the first gripper 70a and the second gripper 70b are located on the outer side of the winding core 80 in the radial direction. In the initial state illustrated in FIGS. 6 and 7, the first gripper 70a and the second gripper 70b are arranged with the central axis J2 interposed therebetween in the left-right direction X when viewed in the axial direction. The first gripper 70a is located on the radial outer side of the first winding jig 81. The second gripper 70b is located on the radial outer side of the second winding jig 82. In the initial state, the first gripper 70a is located on the left side (−X side) of the first winding jig 81. In the initial state, the second gripper 70b is located on the right side (+X side) of the second winding jig 82.

The first gripper 70a is held on the upper side of the first holder 61. The second gripper 70b is held on the lower side of the second holder 62. The first gripper 70a and the second gripper 70b are arranged to be displaced in the axial direction. The first gripper 70a is located on the lower side from the second gripper 70b.

The first gripper 70a and the second gripper 70b have structures similar to each other. The first gripper 70a and the second gripper 70b are arranged to be inverted in the axial direction. In the following description, only the first gripper 70a may be described as a representative of the first gripper 70a and the second gripper 70b.

As illustrated in FIG. 8, the first gripper 70a includes a base material 71, a pair of rollers 72 and 73, and a pair of clamping members 74 and 75. The base material 71 is located on the radial outer side of the first winding jig 81. The base material 71 includes a radially extending portion 71a, a pair of first arms 71b and 71c, and a pair of second arms 71d and 71e. The radially extending portion 71a extends in the radial direction. A direction in which the radially extending portion 71a extends in the initial state is, for example, the left-right direction X. The radially extending portion 71a has, for example, a quadrangular prism shape.

The pair of first arms 71b and 71c extends from the radially inner end portion of the radially extending portion 71a to both respective sides in the front-rear direction Y orthogonal to both the direction in which the radially extending portion 71a extends and the axial direction. The first arm 71b extends, for example, from the radially inner end portion of the radially extending portion 71a to the front side (+Y side). The first arm 71c extends, for example, from the radially inner end portion of the radially extending portion 71a to the rear side (−Y side). Each of the pair of first arms 71b and 71c passes between each of the pair of protruding wall portions 61j and the first bearing portion 61b in the left-right direction X. The pair of first arms 71b and 71c is supported from below by the first connection portion 61d.

The pair of second arms 71d and 71e respectively extends from the distal ends of the pair of first arms 71b and 71c in the left-right direction X in which the radially extending portion 71a extends. The second arm 71d extends to the left side (−X side) from the front (+Y side) end portion of the first arm 71b. The second arm 71e extends to the left side from the rear (−Y side) end portion of the first arm 71c. The pair of second arms 71d and 71e is arranged with the pair of protruding wall portions 61j interposed therebetween in the front-rear direction Y. Each of the pair of second arms 71d and 71e is located between the protruding wall portion 61j and the pressing member 64 in the front-rear direction Y. A part of the pair of second arms 71d and 71e is covered with the pressing member 64 from above. Therefore, even when the first gripper 70a tries to move to the upper side, the pair of second arms 71d and 71e is caught by the pressing member 64. Accordingly, the first gripper 70a is suppressed from being detached to the upper side from the first holder 61.

The pair of rollers 72 and 73 is arranged with the radially extending portion 71a interposed therebetween in the front-rear direction Y. The roller 72 is located, for example, on the front side (+Y side) of the radially extending portion 71a. The roller 73 is located, for example, on the rear side (−Y side) of the radially extending portion 71a. The roller 72 is rotatable about a rotation axis R2. The roller 73 is rotatable about a rotation axis R3. In the present example embodiment, the rotation axis R2 and the rotation axis R3 are parallel to the central axis J2. That is, in the present example embodiment, the axial direction of the rotation axes R2 and R3 is the axial direction of the central axis J2.

Figure 10:
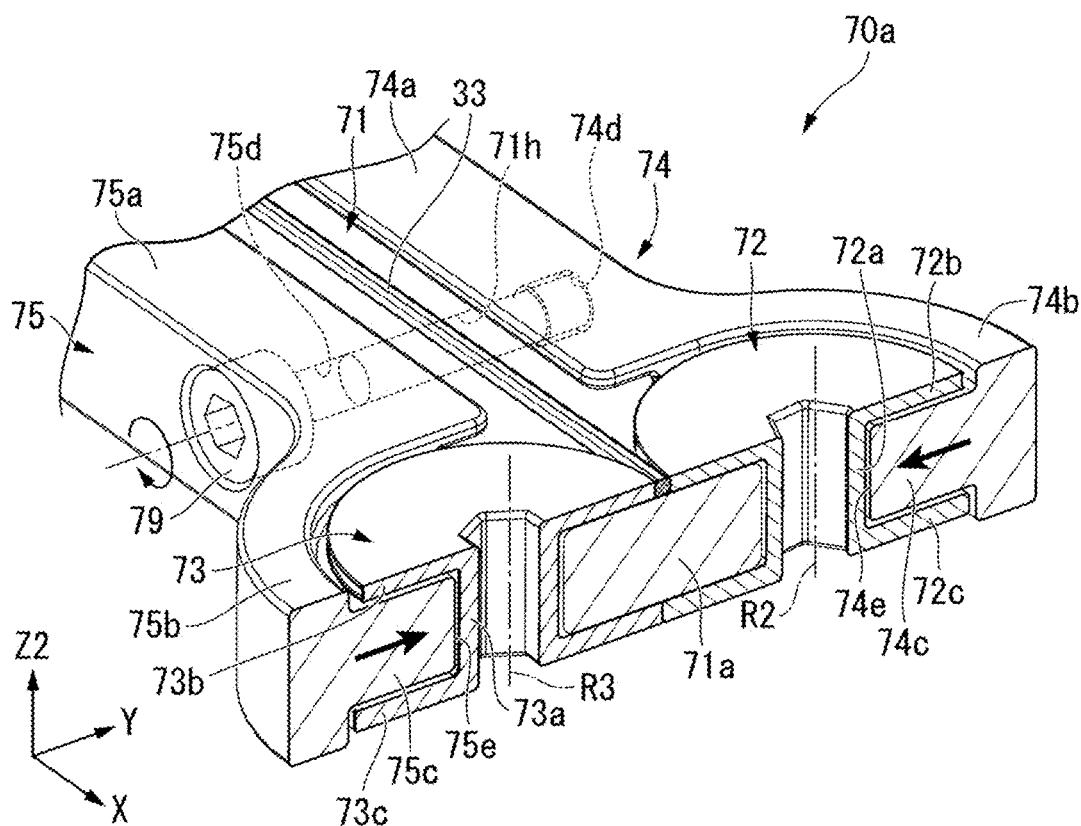
FIG. 10 is a perspective cross-sectional view illustrating a portion of the first gripper of the present example embodiment.

As illustrated in FIG. 10, the roller 72 includes a cylindrical portion 72a, a first roller portion 72b, and a second roller portion 72c. The cylindrical portion 72a has a cylindrical shape opening on both sides in the axial direction around the rotation axis R2. The outer peripheral surface of the cylindrical portion 72a has a cylindrical shape. The inner peripheral surface of the cylindrical portion 72a has a hexagonal cylindrical shape. The first roller portion 72b expands to the radially outer side about the rotation axis R2 from the upper end portion of the cylindrical portion 72a. The first roller portion 72b has an annular shape centered on the rotation axis R2. The first roller portion 72b has, for example, a plate shape having the plate surface facing the axial direction.

Figure 11:
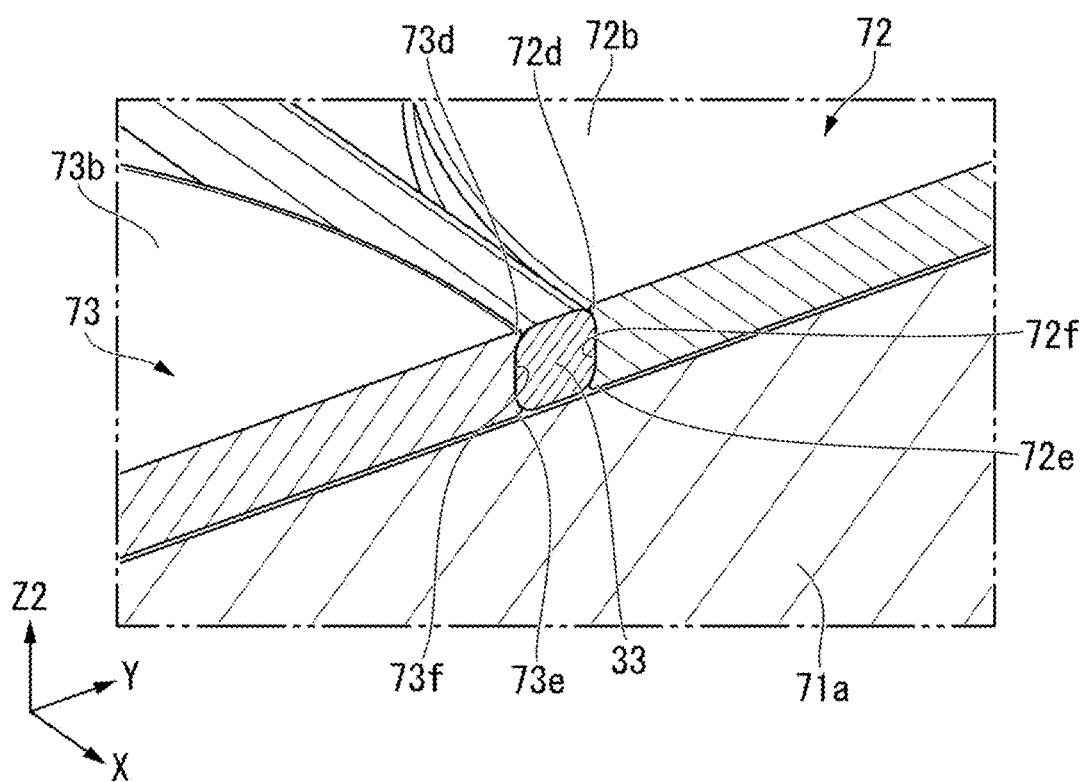
FIG. 11 is a perspective cross-sectional view illustrating a portion of the first gripper of the present example embodiment, and is a partially enlarged view of FIG. 10.

As illustrated in FIG. 11, the outer peripheral surface of the first roller portion 72b is a contact portion 72f that can come into contact with the winding 33 in the radial direction around the rotation axis R2 of the roller 72. That is, the roller 72 has the contact portion 72f. A pair of collar portions 72d and 72e is provided on the outer peripheral surface of the first roller portion 72b. That is, the roller 72 has the pair of collar portions 72d and 72e. The pair of collar portions 72d and 72e protrudes to the outer side from the contact portion 72f in the radial direction around the rotation axis R2 of the roller 72. The pair of collar portions 72d and 72e has an annular shape centered on the rotation axis R2. The pair of collar portions 72d and 72e is arranged to face each other with a space interposed therebetween in the axial direction of the rotation axis R2. The collar portion 72d is located, for example, at the upper end portion of the contact portion 72f. The collar portion 72e is located, for example, at the lower end portion of the contact portion 72f. The pair of collar portions 72d and 72e axially interpose the front (+Y side) edge portion of the winding 33.

As illustrated in FIG. 10, the second roller portion 72c expands to the outer side in the radial direction about the rotation axis R2 from the lower end portion of the cylindrical portion 72a. The second roller portion 72c has an annular shape centered on the rotation axis R2. The second roller portion 72c has, for example, a plate shape having the plate surface facing the axial direction.

The outer diameter of the second roller portion 72c is larger than the outer diameter of the first roller portion 72b, for example. The radially extending portion 71a and the protruding portion 74c to be described later are located between the first roller portion 72b and the second roller portion 72c in the axial direction. The first roller portion 72b and the second roller portion 72c interpose the front (+Y side) portion of the radially extending portion 71a in the axial direction.

In the present example embodiment, the shape of the roller 73 is similar to the shape of the roller 72. Similarly to the roller 72, the roller 73 includes a cylindrical portion 73a, a first roller portion 73b, and a second roller portion 73c. The radially extending portion 71a and the protruding portion 75c to be described later are located between the first roller portion 73b and the second roller portion 73c in the axial direction. The first roller portion 73b and the second roller portion 73c interpose the rear (−Y side) portion of the radially extending portion 71a in the axial direction. As illustrated in FIG. 11, similarly to the roller 72, the roller 73 has a contact portion 73f and a pair of collar portions 73d and 73e. That is, each of the pair of rollers 72 and 73 has the contact portion and the pair of collar portions. The pair of collar portions 73d and 73e axially interpose the rear edge portion of the winding 33.

The first roller portion 72b and the first roller portion 73b can grip the winding 33 with the winding interposed therebetween in the front-rear direction Y. Accordingly, the pair of rollers 72 and 73 can grip the winding 33 with the winding interposed therebetween. In a state where the winding 33 is gripped by the pair of rollers 72 and 73, each of the contact portion 72f and the contact portion 73f is in contact with the winding 33 in the radial direction around the rotation axes R2 and R3 to interpose the winding 33. As illustrated in FIG. 10, the second roller portion 72c and the second roller portion 73c are in contact with each other in the radial direction around the rotation axes R2 and R3.

As illustrated in FIG. 8, the pair of clamping members 74 and 75 is arranged with the radially extending portion 71a and the pair of rollers 72 and 73 interposed in the front-rear direction Y. The clamping member 74 is located on the front side (+Y side) of the radially extending portion 71a and the roller 72. The clamping member 75 is located on the rear side (−Y side) of the radially extending portion 71a and the roller 73.

The clamping member 74 includes a straight portion 74a, a curved portion 74b, and a protruding portion 74c. The straight portion 74a extends in the left-right direction X in which the radially extending portion 71a extends. The straight portion 74a is located on the front side (+Y side) of the radially extending portion 71a. The straight portion 74a has a portion axially interposing the front side portion of the radially extending portion 71a. The curved portion 74b is connected to the radially inner end portion of the straight portion 74a. The curved portion 74b is located on the front side of the roller 72. The curved portion 74b extends in the circumferential direction around the rotation axis R2. The curved portion 74b is curved in a direction to protrude to the front side when viewed in the axial direction.

The protruding portion 74c protrudes from the curved portion 74b toward the radially extending portion 71a. The protruding portion 74c protrudes to the rear side (−Y side) from the curved portion 74b, for example. The protruding portion 74c is located between the first roller portion 72b and the second roller portion 72c in the axial direction. The protruding portion 74c has a bearing concave portion 74e recessed in a direction away from the radially extending portion 71a. The bearing concave portion 74e is recessed to the front side (+Y side) from the rear end portion of the protruding portion 74c. As illustrated in FIG. 10, the cylindrical portion 72a is located inside the bearing concave portion 74e. The inner surface of the bearing concave portion 74e supports the cylindrical portion 72a to be rotatable about the rotation axis R2. The inner surface of the bearing concave portion 74e is pressed against the outer peripheral surface of the cylindrical portion 72a from the front side. The cylindrical portion 72a is interposed in the front-rear direction Y by the protruding portion 74c and the radially extending portion 71a.

The shape of the clamping member 75 is arranged substantially symmetrically in the front-rear direction Y with respect to the shape of the clamping member 74. The clamping member 75 includes a straight portion 75a, a curved portion 75b, and a protruding portion 75c. The straight portion 75a extends in the left-right direction X in which the radially extending portion 71a extends. The straight portion 75a is located on the rear side (−Y side) of the radially extending portion 71a. The straight portion 75a has a portion axially interposing the rear portion of the radially extending portion 71a. The curved portion 75b is connected to the radially inner end portion of the straight portion 75a. The curved portion 75b is located on the rear side of the roller 73. The curved portion 75b extends in the circumferential direction around the rotation axis R3. The curved portion 75b is curved in a direction to be convex to the rear side when viewed in the axial direction.

The protruding portion 75c protrudes from the curved portion 75b toward the radially extending portion 71a. The protruding portion 75c protrudes to the front side (+Y side) from the curved portion 75b, for example. The protruding portion 74c is located between the first roller portion 73b and the second roller portion 73c in the axial direction. The protruding portion 75c has a bearing concave portion 75e recessed in a direction away from the radially extending portion 71a. The bearing concave portion 75e is recessed to the rear side (−Y side) from the front end portion of the protruding portion 75c. The cylindrical portion 73a is located inside the bearing concave portion 75e. The inner surface of the bearing concave portion 75e supports the cylindrical portion 73a to be rotatable about the rotation axis R3. The inner surface of the bearing concave portion 75e is pressed against the outer peripheral surface of the cylindrical portion 73a from the rear side. The cylindrical portion 73a is interposed in the front-rear direction Y by the protruding portion 75c and the radially extending portion 71a.

The clamping member 75 has a through hole 75d penetrating the straight portion 75a in the front-rear direction Y. A bolt 79 passes through the through hole 75d from the rear side (−Y side). The bolt 79 passes through a through hole 71h provided in the radially extending portion 71a in the front-rear direction Y and is fastened into a female screw hole 74d provided in the straight portion 74a of the clamping member 74. As the bolt 79 is fastened, the clamping members 74 and 75 approach each other in the front-rear direction Y. As the bolt 79 is fastened, the cylindrical portion 72a of the roller 72 is pressed against the radially extending portion 71a by the inner surface of the bearing concave portion 74e in the protruding portion 74c. As the bolt 79 is fastened, the cylindrical portion 73a of the roller 73 is pressed against the radially extending portion 71a by the inner surface of the bearing concave portion 75e in the protruding portion 75c.

Accordingly, by adjusting the fastening amount of the bolt 79, the frictional force around the rotation axes R2 and R3 generated between the outer peripheral surfaces of the cylindrical portions 72a and 73a of the rollers 72 and 73 and the inner surfaces of the bearing concave portions 74e and 75e and the side surface of the radially extending portion 71a in the front-rear direction Y can be adjusted. In the following description, the frictional force around the rotation axes R2 and R3 generated between the outer peripheral surfaces of the cylindrical portions 72a and 73a of the rollers 72 and 73 and the inner surfaces of the bearing concave portions 74e and 75e and the side surface of the radially extending portion 71a in the front-rear direction Y is referred to as "the rotational static frictional force of the rollers 72 and 73".

By adjusting the fastening amount of the bolt 79, a force for interposing the winding 33 between the first roller portions 72b and 73b can also be adjusted. That is, the radial frictional force generated between the first roller portions 72b and 73b and the winding 33 can be adjusted by adjusting the fastening amount of the bolt 79. In the following description, the radial frictional force generated between the first roller portions 72b and 73b and the winding 33 is referred to as "the holding static frictional force of the winding 33".

In the present example embodiment, since the second roller portions 72c and 73c are in contact with each other in the front-rear direction Y, a part of the fastening force due to the fastening of the bolt 79 can be received by the second roller portions 72c and 73c. Accordingly, the load applied to the cylindrical portions 72a and 73a and the first roller portions 72b and 73b can be suppressed from becoming excessively large, and the rotational static frictional force of the rollers 72 and 73 and the holding static frictional force of the winding 33 can be suitably adjusted.

The first gripper 70a is held to be movable in the radial direction with respect to the first holder 61 within a range in which the pair of first arms 71b and 71c is movable between the first bearing portion 61b and the protruding wall portion 61j. As illustrated in FIG. 8, the radially outer portion of the first gripper 70a passes through the first guide hole 61i in the radial direction. The radially outer portion of the first gripper 70a is fitted into the first guide hole 61i. In the present example embodiment, the radially outer portion of the first gripper 70a includes the radially outer portion of the radially extending portion 71a and the radially outer portions of the straight portions 74a and 75a. The radially outer end portion of the first gripper 70a protrudes to the radially outer side from the first holder 61.

An elastic force FE toward the radially outer side is applied to the first gripper 70a by the elastic portions 65a and 65b. That is, the elastic portions 65a and 65b apply a force to the pair of rollers 72 and 73 in a direction away from the winding core 80. In the initial state, the elastic portion 65a applies, to the first arm 71b, the elastic force FE toward the left side (−X direction). The elastic portion 65b applies, to the first arm 71c, the elastic force FE toward the left side.

The total value of the elastic forces FE applied by the two elastic portions 65a and 65b is smaller than the holding static frictional force of the winding 33. In addition, the rotational moment generated in the rollers 72 and 73 by applying the elastic force FE of the two elastic portions 65a and 65b to the first gripper 70a is smaller than the rotational static frictional force of the rollers 72 and 73. Therefore, even when the elastic portions 65a and 65b apply the elastic force FE to the rollers 72 and 73, the rollers 72 and 73 do not rotate about the rotation axes R2 and R3, and slippage does not occur between the rollers 72 and 73 and the winding 33. Accordingly, the winding 33 can be interposed and pulled by the pair of rollers 72 and 73, and a tension T can be applied to the winding 33. The magnitude of the tension T is the sum of the magnitudes of the elastic forces FE applied by the two elastic portions 65a and 65b.

As illustrated in FIG. 6, the second gripper 70b includes a pair of rollers 77 and 78 that can be gripped with the winding 33 interposed therebetween. The pair of rollers 77 and 78 is located to be slightly separated above the pair of rollers 72 and 73 of the first gripper 70a. Similarly to the first gripper 70a, the second gripper 70b is held to be movable in the radial direction with respect to the second holder 62. The radially outer portion of the second gripper 70b passes through the second guide hole 62i in the radial direction. The radially outer portion of the second gripper 70b is fitted into the second guide hole 62i. The radially outer end portion of the second gripper 70b protrudes to the radially outer side from the second holder 62.

As described above, the first holder 61 and the second holder 62 are bidirectionally rotatable about the central axis J2, and thus the first gripper 70a held by the first holder 61 and the second gripper 70b held by the second holder 62 are also bidirectionally rotatable about the central axis J2. Accordingly, in the present example embodiment, the first gripper 70a and the second gripper 70b are rotatable about the central axis J2 in the directions opposite to each other.

In the present example embodiment, a worker or the like forms the first winding body 131 and the second winding body 132 by using the winding machine 50 described above. In the following description, an example of a case where the second winding body 132 is formed by the winding machine 50 will be described. Note that, in the present specification, the "worker or the like" includes a worker, an assembling device, and the like that perform each work. Each work may be performed only by the worker, may be performed only by the assembling device, or may be performed by the worker and the assembling device.

In a state where the windings 33 are gripped by the first gripper 70a and the second gripper 70b, the worker or the like assembles the first holder 61 holding the first gripper 70a and the second holder 62 holding the second gripper 70b on the base member 51. As illustrated in FIG. 12, at this time, the second winding jig 82, the winding core 80, and the bearing member 63 are not assembled. In addition, at this time, the winding 33 linearly extends from the first gripper 70a to the second gripper 70b when viewed in the axial direction. In this state, the winding 33 passes over the first hole 81c of the first winding jig 81.

Next, the worker or the like assembles the second winding jig 82 in a state where the winding core 80 is fixed. The worker or the like inserts the winding core 80 into the guide groove 61g from above, and moves the winding core 80 and the second winding jig 82 to the rear side (-Y side) along the guide groove 61g. Accordingly, the worker or the like fits the winding core 80 into the first hole 81c. At this time, the winding core 80 pushes and bends the portion of the winding 33 arranged on the first hole 81c toward the rear side. Accordingly, as illustrated in FIG. 13, the portion of the winding 33 located between the portion gripped by the first gripper 70a and the portion gripped by the second gripper 70b is slightly curved toward the rear side.

In this state, a portion of the winding 33 which is in contact with the rear (-Y side) end portion of the winding core 80 is located between the first guide portion 81d and the second guide portion 82d in the axial direction. As illustrated in FIG. 9, a portion of the winding 33 which is in contact with the rear end portion of the winding core 80 is arranged obliquely along the first guide surface 81e and the second guide surface 82e. After assembling the winding core 80 and the second winding jig 82, the worker or the like fits the bearing member 63 into the fitting hole 62e. Accordingly, the winding machine 50 in the initial state illustrated in FIGS. 6 and 7 is assembled.

The worker or the like rotates the first holder 61 and the second holder 62 about the central axis J2 in the directions opposite to each other with respect to the winding machine 50 in the initial state to wind the winding 33 around the winding core 80. The worker or the like rotates the first holder 61 clockwise about the central axis J2 when viewed from above, and rotates the second holder 62 counterclockwise about the central axis J2 when viewed from above.

Figure 13:
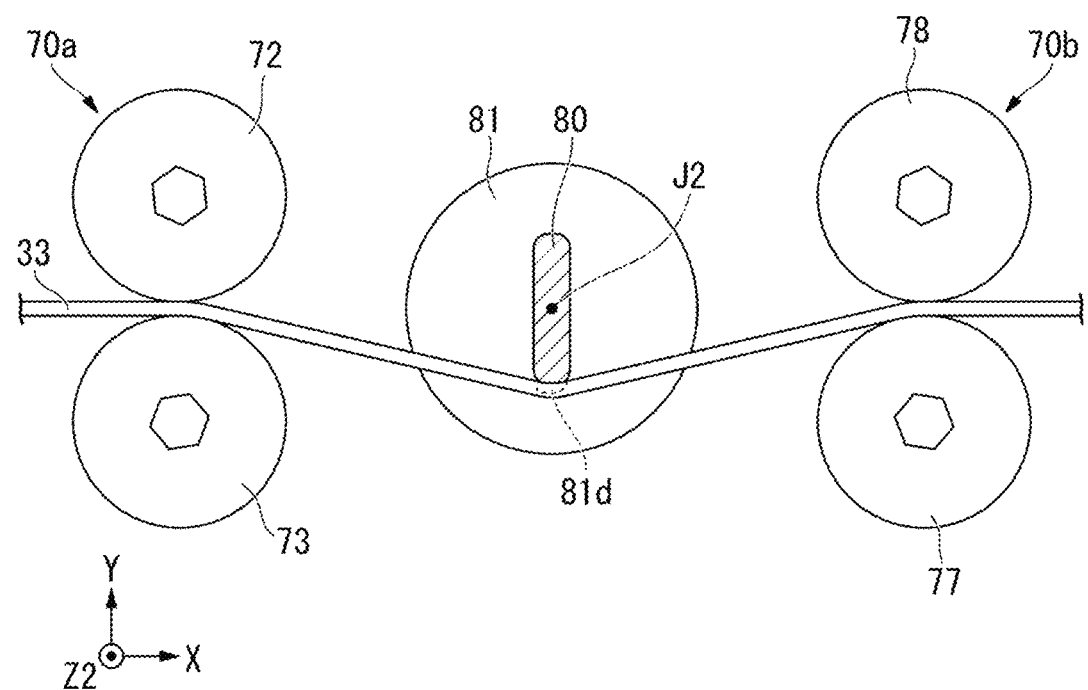
FIG. 13 is a view illustrating a portion of a winding procedure of a winding using the winding machine of the present example embodiment.
Figure 14:
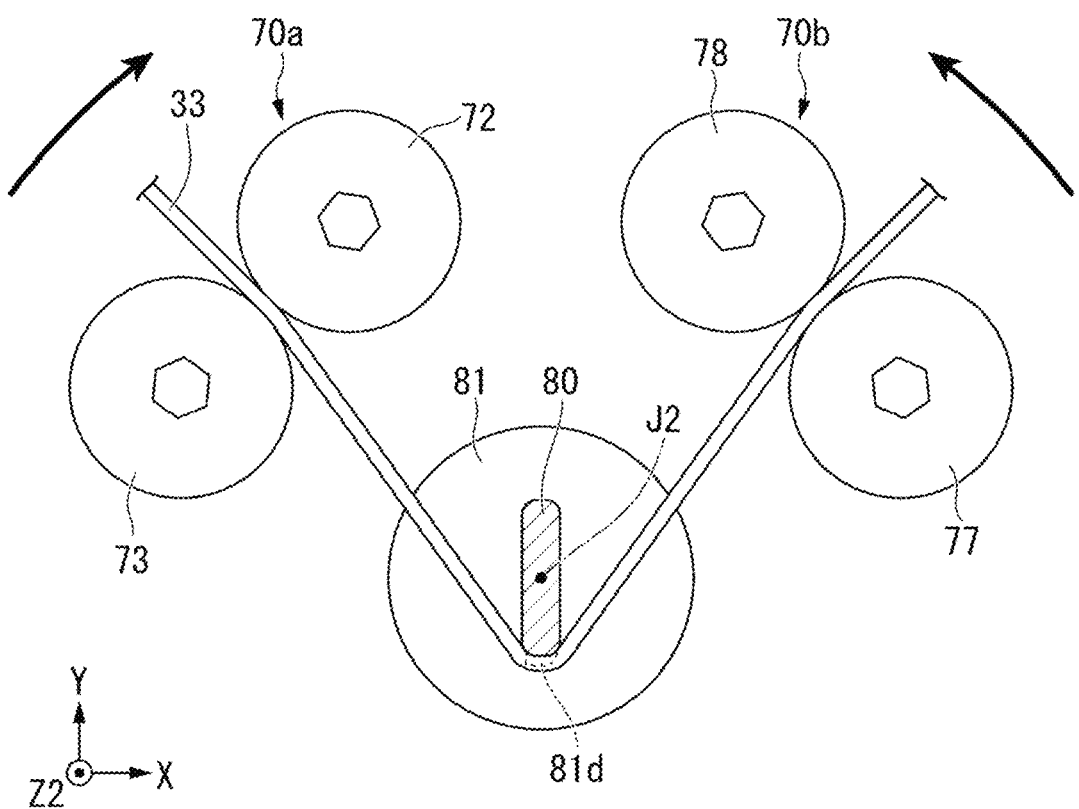
FIG. 14 is a view illustrating another portion of the winding procedure of the winding using the winding machine of the present example embodiment.
Figure 15:
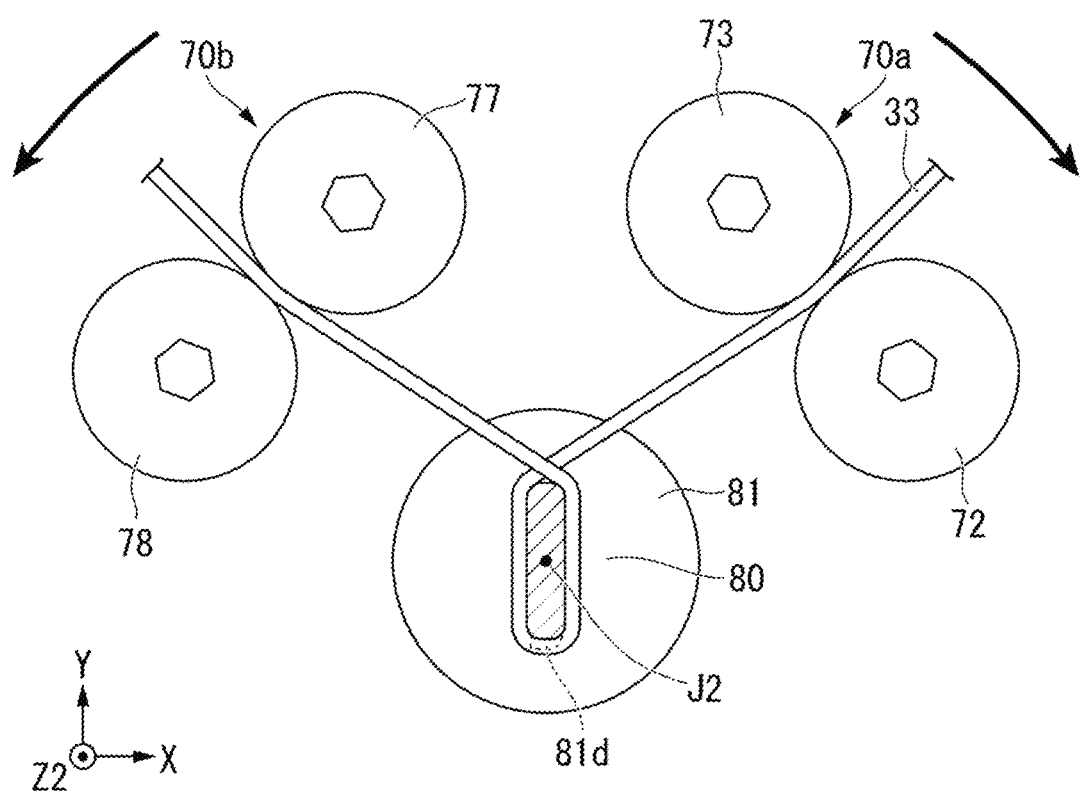
FIG. 15 is a view illustrating still another portion of the winding procedure using the winding machine of the present example embodiment.

Accordingly, as illustrated in FIGS. 13 to 15, the first gripper 70a and the second gripper 70b rotate about the central axis J2 in the directions opposite to each other, and the winding 33 is wound around the winding core 80. By repeating the procedure illustrated in FIGS. 13 to 15, the second winding body 132 wound around the winding core 80 is formed as illustrated in FIG. 16.

Figure 16:
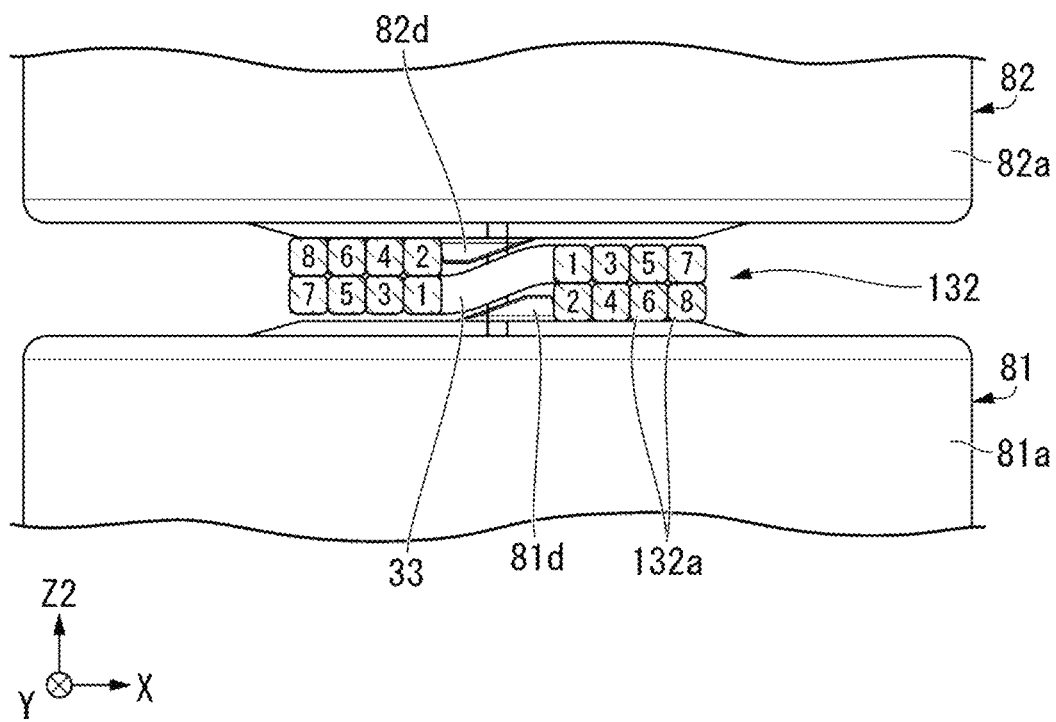
FIG. 16 is a partial cross-sectional view illustrating a state where a winding is wound around a winding core of the present example embodiment.

In FIG. 16, in the cross section of a plurality of second coil wire portions 132a in the second winding body 132, the winding order is virtually indicated by a number. Among the plurality of second coil wire portions 132a stacked in two layers in the axial direction, the second coil wire portion 132a located on the lower side is a portion wound around the winding core 80 by the first gripper 70a. Among the plurality of second coil wire portions 132a stacked in two layers in the axial direction, the second coil wire portion 132a located on the upper side is a portion wound around the winding core 80 by the second gripper 70b.

When the winding 33 is wound around the winding core 80, the winding 33 is pulled to the radially inner side. Therefore, the first gripper 70a which grips the winding 33 is also pulled to the radially inner side to be moved. Accordingly, the elastic portions 65a and 65b are further compressed and deformed, and the elastic force FE applied from the elastic portions 65a and 65b to the pair of rollers 72 and 73 increases. Further, when the rotational moment applied to the pair of rollers 72 and 73 by the elastic force FE becomes larger than the rotational static frictional force of the rollers 72 and 73, the pair of rollers 72 and 73 rotates to sequentially feed the winding 33. Accordingly, the winding 33 can be fed in a state where the tension T is suitably applied to the winding 33. Note that since the holding static frictional force of the winding 33 is larger than the elastic force FE when the pair of rollers 72 and 73 starts to rotate, it is possible to suppress slippage from occurring between the winding 33 and the pair of rollers 72 and 73. As for the second gripper 70b, the winding 33 is fed from the pair of rollers 77 and 78 similarly to the first gripper 70a.

According to the present example embodiment, each of the first gripper 70a and the second gripper 70b includes a pair of rollers that can be gripped with the winding 33 interposed therebetween. At least one of the first gripper 70a and the second gripper 70b is rotatable about the central axis J2. Therefore, by rotating the rotatable gripper, among the first gripper 70a and the second gripper 70b, about the central axis J2, the winding 33 can be wound around the winding core 80. At this time, since the first winding jig 81 and the second winding jig 82 are arranged with the winding core 80 interposed in the axial direction, the movement of the winding 33 in the axial direction can be suppressed by the first winding jig 81 and the second winding jig 82. In addition, since the winding 33 can be gripped by the pair of rollers 72 and 73 and the pair of rollers 77 and 78, the winding 33 can be fed by the rotation of each roller while applying the tension T to the winding 33 as described above. Accordingly, the winding 33 can be wound suitably along the outer peripheral surface of the winding core 80. As described above, according to the present example embodiment, the winding 33 can be suitably wound around the winding core 80 without providing a member or the like that moves in accordance with the timing at which the winding 33 is wound. Therefore, the coil 30 can be suitably manufactured while the winding machine 50 has a simple structure.

According to the present example embodiment, the first gripper 70a and the second gripper 70b are rotatable about the central axis J2 in the directions opposite to each other.

Therefore, as described above, the first gripper 70a and the second gripper 70b are simultaneously rotated about the central axis J2 in the directions opposite to each other, and the winding 33 can be wound around the winding core 80. Accordingly, when the winding 33 is wound around the winding core 80 one or more turns as illustrated in FIG. 15, the portion of the winding 33 fed out from the first gripper 70a and wound around the winding core 80 and the portion fed out from the second gripper 70b and wound around the winding core 80 overlap each other in the axial direction. Therefore, the portion of the winding 33 wound by one of the first gripper 70a and the second gripper 70b can be pressed in the axial direction by the portion of the winding 33 wound by the other of the first gripper 70a and the second gripper 70b.

Specifically, in the present example embodiment, the portion of the winding 33 wound by the first gripper 70a is suppressed from moving to the lower side by the first winding jig 81, and the portion of the winding 33 wound by the second gripper 70b is suppressed from moving to the upper side. In addition, the portion of the winding 33 wound by the second gripper 70b is suppressed from moving to the upper side by the second winding jig 82, and the portion of the winding 33 wound by the first gripper 70a is suppressed from moving to the lower side. Accordingly, the windings 33 can be suitably aligned and wound, and the coil 30 can be more suitably manufactured.

According to the present example embodiment, the winding machine 50 includes the first holder 61 that holds the first gripper 70a and the second holder 62 that holds the second gripper 70b. The first holder 61 has an annular shape surrounding the first winding jig 81. The second holder 62 has an annular shape surrounding the second winding jig 82. The first holder 61 and the second holder 62 are rotatable about the central axis J2 in the directions opposite to each other. Therefore, by rotating the first holder 61 and the second holder 62 in opposite directions to each other about the central axis J2, the first gripper 70a and the second gripper 70b can be easily revolved about the central axis J2.

According to the present example embodiment, the winding machine 50 has the first guide portion 81d located around the winding core 80. The first guide portion 81d has the first guide surface 81e located closer to the upper side toward one side in the circumferential direction around the central axis J2. Therefore, as illustrated in FIG. 9, when the winding 33 is attached to the winding machine 50, the portion of the winding 33 that comes into contact with the winding core 80 can be arranged obliquely to be inclined in the axial direction along the first guide surface 81e. Accordingly, the portion of the winding 33 wound in the first turn by the first gripper 70a and the portion of the winding 33 wound in the first turn by the second gripper 70b can be arranged to be suitably shifted in the axial direction. Therefore, the portion of the winding 33 wound in the second turn by the first gripper 70a and the second gripper 70b is easy to be suitably overlapped with the portion of the winding 33 wound in the first turn in the axial direction.

Specifically, in the present example embodiment, the portion of the winding 33 wound in the second turn by the first gripper 70a is easy to be inserted into the lower side of the portion wound in the first turn by the second gripper 70b. In addition, the portion wound in the second turn by the second gripper 70b is easy to be inserted into the upper side of the portion wound in the first turn by the first gripper 70a.

The end portion of the winding 33 wound in the second turn by the first gripper 70a can be supported from the front side (+Y side) by the radially outer surface of the first guide portion 81d. Therefore, it is possible to suppress the end portion of the winding 33 wound in the second turn by the first gripper 70a from entering the lower side of the portion of the winding 33 arranged obliquely along the first guide portion 81d. Therefore, the portion of the winding 33 wound in the third turn by the first gripper 70a can be suitably overlapped on the outer side of the portion of the winding 33 wound in the first turn by the first gripper 70a. Therefore, the windings 33 can be more suitably aligned and wound.

By providing the first guide portion 81d as described above, it is possible to suppress the displacement of the winding 33 and to suitably align and wind the winding 33. Therefore, the winding 33 can be wound at a relatively high speed in a state where a relatively strong tension T is applied to the winding 33.

According to the present example embodiment, the winding machine 50 has the second guide portion 82d located around the winding core 80. The second guide portion 82d has the second guide surface 82e located closer to the upper side toward one side in the circumferential direction around the central axis J2. The first guide surface 81e and the second guide surface 82e are arranged to face each other with a gap interposed therebetween in the axial direction. Therefore, by the first guide surface 81e and the second guide surface 82e, the portion of the winding 33 in contact with the winding core 80 can be arranged more suitably to be obliquely inclined in the axial direction. Accordingly, the windings 33 can be more suitably aligned and wound.

The end portion of the winding 33 wound in the second turn by the second gripper 70b can be supported from the front side (+Y side) by the radially outer surface of the second guide portion 82d. Therefore, it is possible to suppress the end portion of the winding 33 wound in the second turn by the second gripper 70b from entering the upper side of the portion of the winding 33 arranged obliquely between the first guide portion 81d and the second guide portion 82d. Therefore, the portion of the winding 33 wound in the third turn by the second gripper 70b can be suitably overlapped on the outer side of the portion of the winding 33 wound in the first turn by the second gripper 70b. Accordingly, the windings 33 can be more suitably aligned and wound.

According to the present example embodiment, the first guide portion 81d and the second guide portion 82d are connected to the outer peripheral surface of the winding core 80. Therefore, the portion of the winding 33 brought into contact with the winding core 80 is easy to be brought into contact with the first guide portion 81d and the second guide portion 82d. Accordingly, the winding 33 can be suitably guided by the first guide portion 81d and the second guide portion 82d. Therefore, the windings 33 can be more suitably aligned and wound.

According to the present example embodiment, the first guide portion 81d protrudes from the first winding jig 81 toward the second winding jig 82, and the second guide portion 82d protrudes from the second winding jig 82 toward the first winding jig 81. Therefore, by changing the axial interval between the first winding jig 81 and the second winding jig 82, the axial interval between the first guide portion 81d and the second guide portion 82d can be easily changed. Accordingly, even in a case where the thickness of the winding 33 is changed, by changing the interval between the first guide portion 81d and the second guide portion 82d according to the thickness of the winding 33, the winding 33 can be suitably wound around the winding core 80.

According to the present example embodiment, the roller 72 has the collar portions 72d and 72e protruding from the contact portion 72f to the outer side in the radial direction about the rotation axis R2 of the roller 72. The roller 73 has the collar portions 73d and 73e protruding from the contact portion 73f to the outer side in the radial direction about the rotation axis R3 of the roller 73. Therefore, the windings 33 in contact with the contact portions 72f and 73f can be pressed in the axial direction by the collar portions 72d, 72e, 73d, and 73e. Accordingly, it is possible to suppress the winding 33 gripped by the first gripper 70a from being displaced in the axial direction. In addition, similarly, the collar portion provided on the second gripper 70b can suppress the winding 33 gripped by the second gripper 70b from being displaced in the axial direction. Therefore, when the winding 33 is wound by the first gripper 70a and the second gripper 70b, when the portion of the winding 33 wound by the first gripper 70a and the portion of the winding 33 wound by the second gripper 70b intersect to be displaced in the axial direction, the portions of the winding 33 can be suppressed from coming into contact with each other. Therefore, the winding 33 can be more suitably wound. In addition, the inclination of the winding 33 can be suppressed. Accordingly, it is possible to suppress the twisting of the winding 33.

According to the present example embodiment, each the pair of rollers 72 and 73 includes a pair of collar portions arranged to face each other with a space interposed therebetween in the axial direction of the rotation axis R2, R3. Therefore, the winding 33 can be interposed and pressed in the axial direction by each of the pair of collar portions 72d and 72e and the pair of collar portions 73d and 73e. Accordingly, the winding 33 can be further suppressed from being displaced in the axial direction with respect to the pair of rollers 72 and 73. Therefore, when the winding 33 is wound, it is possible to further suppress the contact between the portion of the winding 33 wound by the first gripper 70a and the portion of the winding 33 wound by the second gripper 70b. Therefore, the winding 33 can be more suitably wound. In addition, the inclination of the winding 33 can be further suppressed. Accordingly, it is possible to further suppress the twisting of the winding 33.

According to the present example embodiment, the winding machine 50 includes the elastic portions 65a and 65b that apply a force to the pair of rollers 72 and 73 in a direction away from the winding core 80. Therefore, the tension T can be applied to the winding 33 gripped by the pair of rollers 72 and 73 by the force received from the elastic portions 65a and 65b. Accordingly, the tension T can be easily applied to the winding 33.

According to the present example embodiment, the winding 33 wound around the winding core 80 is a flat wire. Therefore, it is easy to align and wind the winding 33 with respect to the winding core 80.

Figure 17:
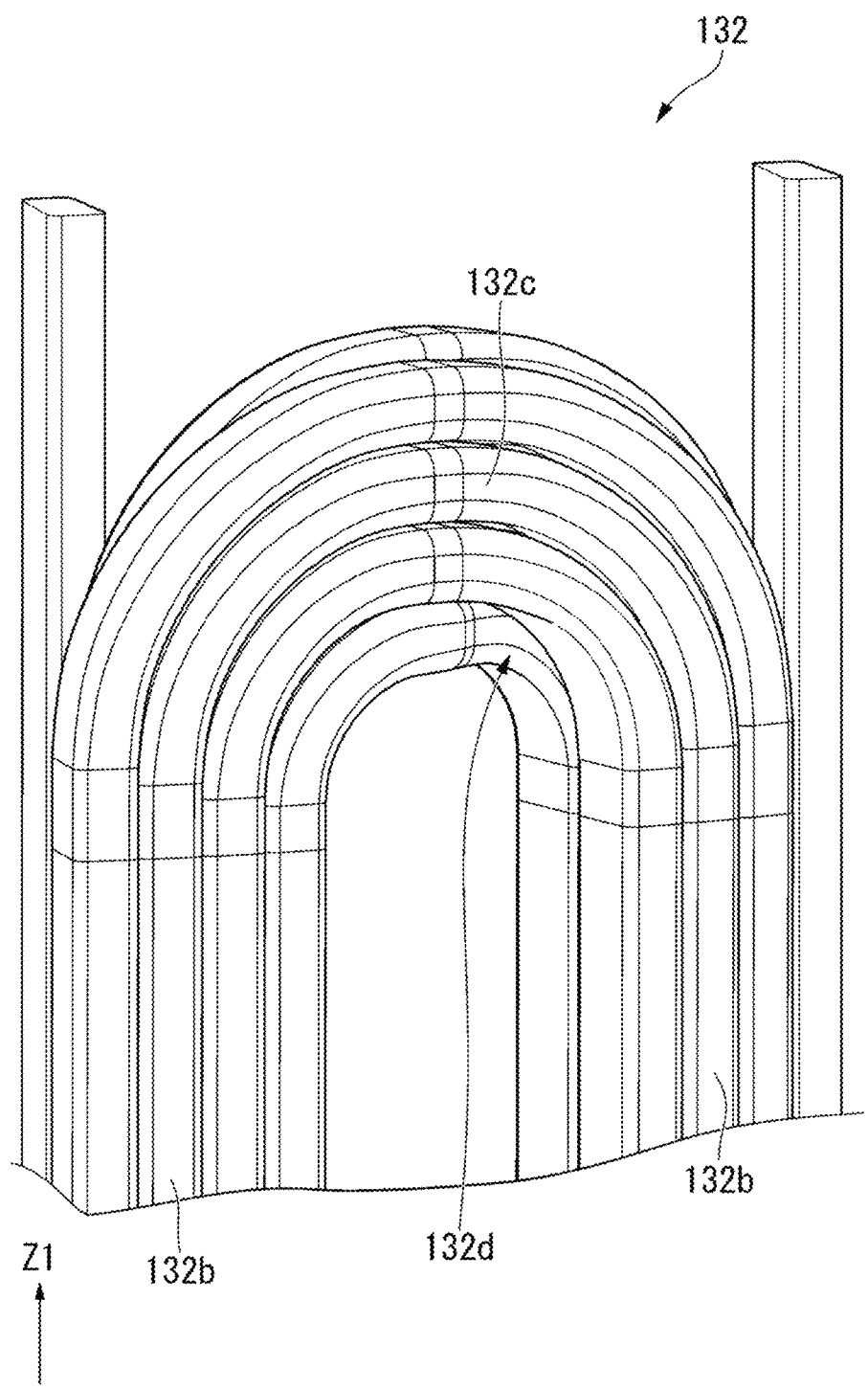
FIG. 17 is a perspective view illustrating a portion of a second winding body of the present example embodiment.

As illustrated in FIG. 17, the second winding body 132 formed by using the winding machine 50 is provided with a first concave portion 132d generated by providing the first guide portion 81d. The first concave portion 132d is provided in a circumferentially extending portion 132c connecting the end portions of the pair of second axially extending portions 132b in the motor axial direction to each other. More specifically, the first concave portion 132d is provided at the first turn of the circumferentially extending portion 132c. The first concave portion 132d is recessed in the motor radial direction. Although not illustrated, the second winding body 132 is also provided with a second concave portion generated by providing the second guide portion 82d. The second concave portion is provided in a portion of the circumferentially extending portion 132c on the side opposite to the side where the first concave portion 132d is provided in the motor radial direction.

Figure 18:
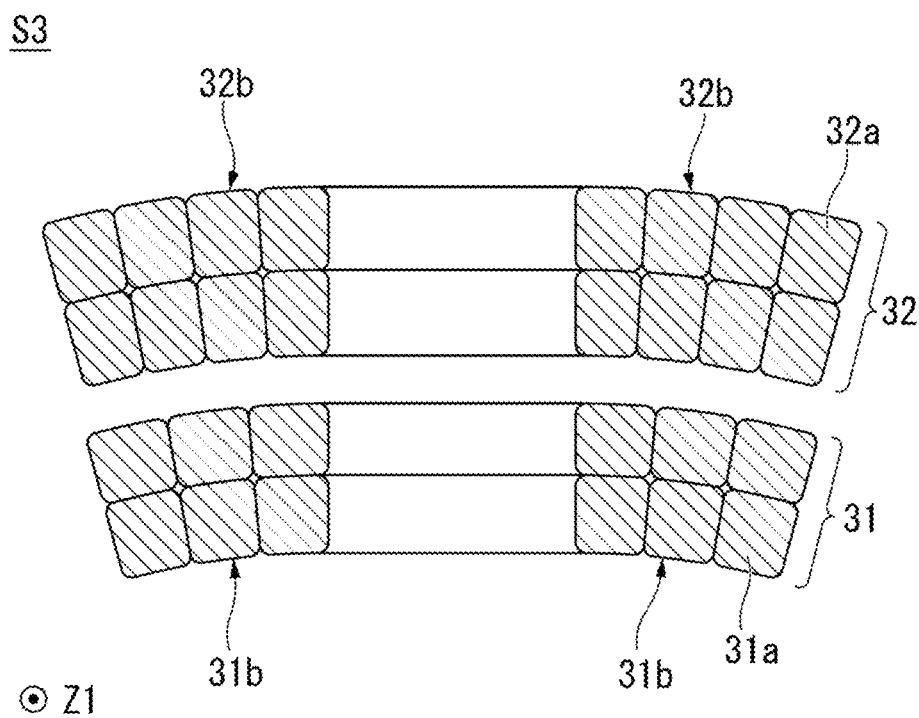
FIG. 18 is a cross-sectional view illustrating another portion of the procedure in the method of manufacturing the coil of the present example embodiment.

As illustrated in FIG. 18, the compression process S3 is a process of compressing and deforming the first winding body 131 and the second winding body 132. As illustrated in FIG. 4, in the present example embodiment, the compression process S3 includes a first compression process S3a and a second compression process S3b. The first compression process S3a is a process of compressing and deforming the first winding body 131. The second compression process S3b is a process of compressing and deforming the second winding body 132. In the present example embodiment, the first compression process S3a and the second compression process S3b are provided before the connection process S4. Either the first compression process S3a or the second compression process S3b may be performed first, or may be performed simultaneously.

In the first compression process S3a of the present example embodiment, the contour shape of the first axially extending portion 131b in the cross section orthogonal to the motor axial direction is deformed into a fan shape in which the dimension in the motor circumferential direction decreases toward the inner side in the motor radial direction. Accordingly, the cross-sectional shape of the portion configuring the first axially extending portion 131b among the flat wires configuring the first winding body 131, that is, the cross-sectional shape of the first coil wire portion 131a is deformed into a trapezoidal shape in which the dimension in the motor circumferential direction decreases toward the inner side in the motor radial direction. By the first compression process S3a, the first axially extending portion 131b becomes the first axially extending portion 31b, and the above-described first winding body 31 is formed.

In the second compression process S3b of the present example embodiment, the contour shape of the second axially extending portion 132b in the cross section orthogonal to the motor axial direction is deformed into a fan shape in which the dimension in the motor circumferential direction decreases toward the inner side in the motor radial direction. Accordingly, the cross-sectional shape of the portion configuring the second axially extending portion 132b among the flat wires configuring the second winding body 132, that is, the cross-sectional shape of the second coil wire portion 132a is deformed into a trapezoidal shape in which the dimension in the motor circumferential direction decreases toward the inner side in the motor radial direction. By the second compression process S3b, the second axially extending portion 132b becomes the second axially extending portion 32b, and the above-described second winding body 32 is formed.

As described above, in the compression process S3, the contour shape of the first axially extending portion 131b in the cross section orthogonal to the motor axial direction is deformed into a fan shape in which the dimension in the motor circumferential direction decreases toward the inner side in the motor radial direction, and the contour shape of the second axially extending portion 132b in the cross section orthogonal to the motor axis J1 is deformed into a fan shape in which the dimension in the motor circumferential direction decreases toward the inner side in the motor radial direction.

A method of compressing and deforming each winding body in first compression process S3a and second compression process S3b is not particularly limited. In the first compression process S3a and the second compression process S3b of the present example embodiment, each axially extending portion is subjected to press working by a mold surrounding each axially extending portion of each winding body, and each winding body is compressed and deformed.

The connection process S4 is a process of arranging the second winding body 32 on the outer side of the first winding body 31 in the motor radial direction to connect the first winding body 31 and the second winding body 32. In the connection process S4 of the present example embodiment, the one end portion 31c of the first winding body 31 and the one end portion 32c of the second winding body 32 are connected. As described above, a method of connecting the one end portion 31c and the one end portion 32c is not particularly limited. Through the above processes, the coil 30 is manufactured.

According to the present example embodiment, the coil 30 includes the first winding body 31 and the second winding body 32 connected to the first winding body 31. When N is a freely-selected integer of 1 or more, and M is a freely-selected integer larger than N, the first winding body 31 is an N-layer winding body aligned and wound in two rows aligned in the motor radial direction, and the second winding body 32 is an M-layer winding body aligned and wound in two rows aligned in the motor radial direction. In the case of aligning and winding flat wires in two rows, it is easy to align and wind the flat wires with high accuracy as compared with the case of aligning and winding the flat wires in three or more rows. Therefore, by connecting a plurality of winding bodies each aligned and wound in two rows, it is possible to easily manufacture the coil 30 in which flat wires are accurately aligned in four or more rows. Accordingly, the distortion of the shape of the coil 30 can be suppressed.

M is a freely-selected integer larger than N. Therefore, the number of layers of the second winding body 32 located on the outer side of the first winding body 31 in the motor radial direction is larger than the number of layers of the first winding body 31. Here, in a case where the motor 1 is an inner rotor type motor, an interval between the teeth 22 adjacent to each other in the motor circumferential direction increases toward the outer side in the motor radial direction. Therefore, by making the number of layers of the second winding bodies 32 located on the outer side of the first winding body 31 in the motor radial direction larger than the number of layers of the first winding body 31, more windings can be arranged between the teeth 22 with high space efficiency. Accordingly, the total number of windings of the coil 30 can be suitably increased.

For example, in a case where a multilayer wound coil is simply formed by aligning and winding flat wires, the total number of windings of the coil is the number obtained by multiplying the number of alignments by the number of layers. Therefore, for example, in a case where at least one of the number of alignments and the number of layers is limited, there is a possibility that the total number of windings of the coil that can be adopted is limited. On the other hand, according to the present example embodiment, since the number of layers of the first winding body 31 and the number of layers of the second winding body 32 are different from each other, it is easy to adjust the total number of windings of the coil 30 by adjusting the number of layers of each winding body. Therefore, the degree of freedom of the total number of windings of the coil 30 that can be adopted can be improved. In the present example embodiment, for example, the total number of windings of the coil 30 can be set to any even number of six or more.

In addition, according to the present example embodiment, the contour shape of the axially extending portion 30b in the cross section orthogonal to the motor axial direction is a fan shape in which the dimension in the motor circumferential direction decreases toward the inner side in the motor radial direction. Therefore, the coils 30 can be suitably filled and arranged between the teeth 22 adjacent to each other in the motor circumferential direction. Accordingly, it is easy to further improve the space factor of the coil 30.

In addition, for example, in a case where the contour shape of the axially extending portion is formed into the fan shape as described above in the conventional multilayer wound coil, the cross-sectional shape of the coil wire portion located on the inner side in the motor radial direction has a smaller dimension in the motor circumferential direction and a larger dimension in the motor radial direction. On the other hand, the cross-sectional shape of the coil wire portion located on the outer side in the motor radial direction has a larger dimension in the motor circumferential direction and a smaller dimension in the motor radial direction. Accordingly, the cross-sectional shape of at least some of the coil wire portions tends to be flat. In this case, the eddy current loss of the coil tends to increase. When a flat wire having a substantially square cross-sectional shape is deformed to have a flat cross-sectional shape, the deformation amount of the flat wire tends to increase. Therefore, when the flat wire is deformed, there is a possibility that the enamel coating provided on the surface is broken. In addition, the deformation of each coil wire portion configuring the axially extending portion tends to be non-uniform.

On the other hand, according to the present example embodiment, the number of layers of the second winding body 32 located on the outer side of the first winding body 31 in the motor radial direction is larger than the number of layers of the first winding body 31. Therefore, the number of layers of the second winding bodies 32 configuring the portion of the axially extending portion 30b on the outer side in the motor radial direction can be relatively large, and the number of layers of the first winding bodies 31 configuring the portion of the axially extending portion 30b on the inner side in the motor radial direction can be relatively small. Accordingly, even when the contour shape of the axially extending portion 30b is deformed into a fan shape, the deformation amount of each coil wire portion configuring the axially extending portion 30b can be reduced. Therefore, the cross-sectional shape of each coil wire portion can be suppressed becoming flat. Therefore, it is possible to suppress an increase in eddy current loss of the coil 30. In addition, it is possible to suppress breakage of the enamel coating provided on the surface of the flat wire. In addition, it is possible to suppress the deformation of each coil wire portion configuring the axially extending portion 30b from becoming non-uniform.

For example, in a case where flat wires are simply aligned and wound to form a multilayer wound coil, in a certain number of layers or the like, the contour shape of the axially extending portion may be difficult to be compressed and deformed into a fan shape due to the increase in the deformation amount of the flat wires as described above. Therefore, in a case where the contour shape of the axially extending portion is formed in a fan shape, the number of layers and the like are likely to be limited, and there is a possibility that the total number of windings of the coil that can be adopted is limited. On the other hand, according to the present example embodiment, the contour shape of the axially extending portion can be formed into a fan shape while suppressing the deformation amount of each coil wire portion as described above. Therefore, it is possible to suppress the occurrence of limitation on the total number of windings of the coil 30 that can be adopted, and it is easy to adopt the desired total number of windings of the coil 30 within an even number range of six or more.

According to the present example embodiment, the first compression process S3a and the second compression process S3b are provided before the connection process S4. Therefore, it is possible to connect the first winding body 31 and the second winding body 32 after the first winding body 131 and the second winding body 132 are respectively deformed to form the first winding body 31 and the second winding body 32. Accordingly, each winding body can be easily compressed and deformed as compared with a case where the first winding body 131 and the second winding body 132 are collectively compressed and deformed after being bonded.

The present disclosure is not limited to the above-described example embodiment, and another configuration may be adopted within the scope of the technical idea of the present disclosure. The type of the winding wound by the winding machine is not particularly limited. The winding may be, for example, a round wire. One of the first gripper and the second gripper may be non-rotatable about the central axis of the winding core. In this case, the winding core may be rotatable about the central axis. In this case, the winding can be wound similarly to the above-described example embodiment by simultaneously rotating the other gripper rotatable about the central axis and the winding core in the same direction about the central axis. The first gripper and the second gripper may be rotatable only in one direction around the central axis.

The first guide portion may be provided on the winding core. The first guide portion may not have the first guide surface. The first guide portion may not be provided. The second guide portion may be provided on the winding core. The second guide portion may not have the second guide surface. The second guide portion may not be provided.

One of the pair of rollers of the first gripper may not have the collar portion. One of the pair of rollers of the second gripper may not have the collar portion. The collar portion may not be provided. The elastic portion may be any member as long as a force is applied to the pair of rollers in a direction away from the winding core. One elastic portion may be provided for each gripper, or three or more elastic portions may be provided for each gripper. The elastic portion may not be provided.

N is not particularly limited as long as it is an integer of 1 or more. M is not particularly limited as long as it is an integer larger than N. L is not particularly limited as long as it is an integer larger than M. For example, N may be 1, M may be 2, and L may be 3. That is, the first winding body may be a single-layer winding body, the second winding body may be a two-layer winding body, and the third winding body may be a three-layer winding body. In addition, M may be greater than N by 2 or more, and L may be greater than M by 2 or more. N, M, and L are preferably, for example, 10 or less. This is because it is easy to wind the flat wire to form each winding body, and it is easy to compress and deform each winding body. In addition, M is preferably, for example, three times or less of N. In this way, when the second winding body is compressed and deformed, the cross-sectional shape of the coil wire portion configuring the second axially extending portion can be suppressed from becoming flatter. The contour shape of the axially extending portion in the cross section orthogonal to the axial direction may not be a fan shape. The cross-sectional shape of the coil wire portion configuring the axially extending portion may not be a trapezoidal shape.

The process of compressing and deforming the first winding body and the process of compressing and deforming the second winding body may be provided after the process of connecting the first winding body and the second winding body. The processes of compressing and deforming the first winding body and the second winding body may not be provided. The coil formed by the winding machine of the present disclosure is not particularly limited. The coil formed by the winding machine of the present disclosure may be the first winding body itself or the second winding body itself.

The motor to which the coil formed by the winding machine of the present disclosure is applied is not particularly limited. The motor to which the coil formed by the winding machine of the present disclosure is applied may be an outer rotor type motor. The configurations and methods described above in the present specification can be appropriately combined within a range consistent with each other.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A winding machine comprising:
a winding core around which a winding is wound;
a first winding jig and a second winding jig positioned with the winding core interposed therebetween in an axial direction of a central axis of the winding core; and
a first gripper and a second gripper that are located on an outer side of the winding core in a radial direction around the central axis; wherein
an outer edge portion of the first winding jig in the radial direction and an outer edge portion of the second winding jig in the radial direction are located on an outer side, in the radial direction, from the winding core;
each of the first gripper and the second gripper includes a pair of rollers to interpose and grip the winding; and
at least one of the first gripper or the second gripper is rotatable about the central axis.

2. The winding machine according to claim 1, wherein the first gripper and the second gripper are rotatable about the central axis in directions opposite to each other.

3. The winding machine according to claim 2, further comprising:
a first holder that holds the first gripper; and
a second holder that holds the second gripper; wherein
the first holder has an annular shape surrounding the first winding jig;
the second holder has an annular shape surrounding the second winding jig; and
the first holder and the second holder are rotatable about the central axis in directions opposite to each other.

4. The winding machine according to claim 1, further comprising a first guide portion that is located around the winding core; wherein
the first guide portion includes a first guide surface opposing one side in the axial direction of the central axis; and
the first guide surface is located closer to one side in the axial direction of the central axis toward one side in a circumferential direction around the central axis.

5. The winding machine according to claim 4, further comprising a second guide portion that is located around the winding core; wherein
the second guide portion includes a second guide surface opposing another side in the axial direction of the central axis;
the second guide surface is located closer to one side in the axial direction of the central axis toward one side in the circumferential direction around the central axis; and
the first guide surface and the second guide surface oppose each other with a gap interposed therebetween in the axial direction of the central axis.

6. The winding machine according to claim 5, wherein the first guide portion and the second guide portion are connected to an outer peripheral surface of the winding core.

7. The winding machine according to claim 5, wherein
the first guide portion protrudes from the first winding jig toward the second winding jig; and
the second guide portion protrudes from the second winding jig toward the first winding jig.

8. The winding machine according to claim 1, wherein
each of the pair of rollers includes a contact portion that is contactable with the winding in a radial direction around a rotation axis of the roller; and
at least one of the pair of rollers includes at least one collar portion protruding from the contact portion to an outer side in the radial direction about the rotation axis of the roller.

9. The winding machine according to claim 8, wherein
each of the pair of rollers includes a pair of the collar portions; and
the pair of collar portions are opposed to each other with a space interposed therebetween in the axial direction of the corresponding rotation axis.

10. The winding machine according to claim 1, further comprising an elastic portion that applies a force to the pair of rollers in a direction away from the winding core.

11. A method of manufacturing a coil, comprising winding a winding by using the winding machine according to claim 1.

12. The method of manufacturing the coil according to claim 11, wherein the winding is a flat wire.

* * * * *